United States Patent
Toho

(10) Patent No.: US 6,292,587 B1
(45) Date of Patent: Sep. 18, 2001

(54) IMAGE ENCODING METHOD AND APPARATUS WITH ADAPTIVE PREDICTION

(75) Inventor: Masato Toho, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/240,864

(22) Filed: Feb. 1, 1999

(30) Foreign Application Priority Data

Feb. 12, 1998 (JP) .................................................. 10-029791

(51) Int. Cl.$^7$ ............................. G06K 9/36; H04N 1/417; H04B 1/66
(52) U.S. Cl. .................. 382/238; 358/261.2; 375/240.12
(58) Field of Search .................................... 382/238, 239, 382/232; 348/394, 409–419; 358/261.2, 430; 375/240.02, 240.12

(56) References Cited

U.S. PATENT DOCUMENTS

| | | | | |
|---|---|---|---|---|
| 4,028,731 | * | 6/1977 | Arps et al. | 358/430 |
| 5,828,789 | * | 10/1998 | Yokose et al. | 382/239 |
| 5,991,449 | * | 11/1999 | Kimura et al. | 382/238 |
| 6,188,793 | * | 2/2001 | Kimura et al. | 382/238 |

FOREIGN PATENT DOCUMENTS

A-9-200774 7/1997 (JP) ................................. H04N/7/32
A-9-224253 8/1997 (JP) ................................. H04N/7/32

OTHER PUBLICATIONS

"Fast residue coding for lossless textual image compression," Constantinescu et al., Proceedings of Data Compression Conference, 1977, pp. 397–406.*

* cited by examiner

Primary Examiner—Thomas O. Lee
Assistant Examiner—Wenpeng Chen
(74) Attorney, Agent, or Firm—Oliff & Berridge, PLC

(57) ABSTRACT

Reversible encoding with a high compression rate is fast performed for images produced by a computer. The following processing is performed for each line. First, prediction is performed based on a first prediction method, it is determined whether the prediction value matches the pixel value of a target pixel, and if so, a code indicating the first prediction method is outputted. If a prediction value by the first prediction method does not match the pixel value of the target pixel, prediction values by second and subsequent prediction methods are obtained for the first time, and these values are compared with the pixel value of the target pixel. If there is a matching prediction value, a code indicating a corresponding prediction method is outputted. If the pixel value of the target pixel does not match any prediction values, a prediction error is outputted.

19 Claims, 23 Drawing Sheets

$P = X$ $P = Y$ $P = \dfrac{X + Y}{2}$ a Immediately Preceding b Immediately Above c Upper Left d Upper Right (X: Target Pixel)
Example of prediction method of present invention

IMAGE ENCODING METHOD AND APPARATUS WITH ADAPTIVE PREDICTION

BACKGROUND OF THE INVENTION

1. Field of the Invention

The present invention relates to an image encoding method and apparatus, and more particularly, to reversible encryption for multi-valued images.

2. Description of the Related Art

Full color images generally have a great amount of data. For example, four-color full color images of 300 SPI (spot per inch), A4 size have a data quantity of about 32 MB. Accordingly, when images are accumulated or transmitted, image compression may be used. A memory capacity required for accumulation and time required for transmission can be reduced by image compression, whereas since the image compression itself applies complex processing to an entire image, image compression by software has been time-consuming. Although hardware dedicated to image compression may be used to reduce the time, adding the hardware has been costly.

For example, in nonreversible encryption called a base line process defined in JPEG (Joint Photographic Expert Group), which is a standard of image encryption, an image is divided into blocks, each with eight pixels wide and eight pixels long, transformation called DCT (Discrete Cosine Transform) is applied to each block, a block image is transformed into frequency components before being quantized, and finally Huffman encoding is performed. FIG. 1 shows an example of a block diagram of an apparatus that performs compression using the JPEG method.

That is, in the example of FIG. 1, an image input unit 10 divides an image into blocks, each with eight pixels wide and eight pixels long, and a DCT transformation unit 11 subjects the image of each block to DCT transformation. A quantization unit 12 quantizes the DCT transformation data for each DCT coefficient using a quantization matrix to compress high-frequency components. Furthermore, an encoding unit 13 subjects the quantized data to entropy encoding (Huffman encoding) and outputs a result from a code output unit 14.

Since DCT performs two eight-by-eight matrix multiplications and quantization is achieved by divisions among elements of the matrix, to process one pixel of one color requires 16 multiplications, 14 additions, and one division. An entire image of 300 SPI, which contains about eight million pixels of four colors, requires a total of about five hundred and twelve million multiplications, four hundred and forty-eight million additions, and thirty-two million divisions. With Huffman encoding, image reading, and other overheads further added, one or more minutes have been required to compress a full color image of 300 SPI, A4 size even by the use of the most advanced workstation.

On the other hand, with general-purpose data compression methods such as LZW (Lempel-Ziv-Welch), the use of a complex compression method using dictionaries provides no significant improvement in processing time and leads to a low compression rate.

A prediction encoding system enables compression with a relatively small amount of computation. There is disclosed in e.g., Japanese Published Unexamined Patent Application No. Hei 9-200774, an apparatus that uses the values of a plurality of surrounding pixels as prediction values to perform reversible encoding by using information for identifying a prediction part outputting the smallest prediction error and the prediction error. FIG. 2 shows the configuration of the apparatus.

This apparatus comprises: a plurality of prediction units 20 that predict the value of a target pixel from the values of pixels around it on the basis of respectively different parameters; prediction error calculation units 21 that calculate differences (prediction errors) between prediction values obtained by the plurality of prediction units 20 and the value of target pixel; a prediction selection unit 22 that selects a prediction unit on the basis of the magnitude of the prediction errors and priority; a priority setting unit 23 that sets priority for each of the plurality of prediction units; and an encoding unit 24 that encodes the value of target pixel on the basis of a prediction value obtained by the selected prediction unit. The priority setting unit 23 determines the order of selection on the basis of selection history. The prediction selection unit 22 comprises: a minimum prediction error detection unit 221; a first multiplexer 222 that selectively outputs a prediction unit on the basis of a minimum prediction error and priority set by the priority setting unit 23; a latch unit 223 that latches selective output; and a second multiplexer 224 that outputs prediction errors supplied from the prediction units 20 on the basis of selective output from the latch unit 223. The prediction unit 20 performs prediction using the values of left, upper, and other pixels, as shown in FIG. 3.

This apparatus, which uses pixels around a target pixel or the average of them as a prediction method, requires no multiplication and division for pixel values. However, multiple prediction units must be used to obtain a high compression rate, and prediction and error calculation, selection of a prediction unit to give a minimum error, and determination of priority of predictors are performed for each pixel. Therefore, implementing this compression apparatus by software would require much time for compression.

There is disclosed in Japanese Published Unexamined Patent Application No. Hei 9-224253 an apparatus that reversibly compresses images produced in computer graphics and page description language (PDL) processing systems.

This apparatus comprises: an image input part that inputs images; a plurality of pixel value prediction parts that predict the pixel values of a plurality of pixels to be encoded within an image inputted by the image input part by respectively different prediction methods; a prediction error calculation part that calculates an error between the value of a target pixel within the image inputted by the image input part and a prediction value predicted by a predetermined prediction method; a match determination part that determines whether or not prediction values predicted by the plurality of pixel value prediction parts match the value of a target pixel; a selection part that alternatively outputs, on the basis of the determination output of the match determination part, identification information for identifying a pixel value prediction part whose prediction value is determined matching by the match determination part and an error calculated by the prediction error calculation part; an encoding part that encodes the identification information and the error outputted by the selection part; and an output part that output codes encoded by the encoding part.

FIG. 4 is a block diagram showing the configuration of this apparatus.

In FIG. 4, image data 34 is supplied from an image input unit 30 to a first prediction unit 31, a second prediction unit 32, and a prediction error calculation unit 33. The first prediction unit 31 and the second prediction unit 32 each predict the pixel value of a target pixel on the basis of the image data 34 by a predetermined method and outputs it to a selection unit 37 as prediction value data 35. The prediction error calculation unit 33 predicts the pixel value of the target pixel on the basis of the image 34 by a predetermined method, subtracts the predicted value from the actual pixel value of the target pixel, and outputs a result to the selection unit 37 as prediction error data 36.

The selection unit 37 determines from the image data 34 and the prediction value data 35 whether the prediction on the target pixel is correct or incorrect. As a result, the identification number of a prediction unit that made prediction correctly, if any, is outputted to the encoding unit 39; if there is no prediction unit that made prediction correctly, the prediction error data 36 is converted into prediction status data 38 before being sent to an encoding unit 39.

The encoding unit 39 uses a predetermined encoding method to encode the identification number 35 of the prediction unit or the prediction error data 36, and sends a result to a code output unit 41 as code data 40. The code output unit 41 outputs the code data 40 to the outside as output codes.

Here, the prediction units perform prediction using the pixel values of immediately left and immediately upper pixels and the like with respect to a target pixel, as shown in FIG. 5.

FIGS. 6 and 7 show the operation of the apparatus. FIG. 6 shows the whole of prediction encoding processing and FIG. 7 shows details of selection processing of the prediction units. The contents of the operation will not be described because they can be easily understood from the figure.

The apparatus does not require multiplications and divisions for pixel values because it uses pixels around a target pixel as a prediction method. This apparatus also has an advantage that a high compression rate is obtained for images produced by computer graphics or the like. Furthermore, since an error is calculated only once only when a prediction value and the value of a target pixel do not match, computational complexity at software configuration is somewhat less than with the apparatus described in Japanese Published Unexamined Patent Application No. Hei 9-200774.

However, the apparatus must also use many prediction units to obtain a high compression ratio, and if the compression apparatus is implemented by software, processing shown in FIGS. 6 and 7 is performed. In other words, since prediction by each prediction unit, match determination, and error calculation are performed for each pixel, a great deal of time is required for compression when these processes are implemented by software. For example, about 30 seconds are required to compress a full color image of 300 SPI, A4 size.

SUMMARY OF THE INVENTION

The present invention has been made in consideration of the above-described situation, and it is an object of the present invention to offer a method and apparatus for fast performing reversible encoding with a high compression rate for images produced by page description language processing systems, computer graphics, and other computer techniques.

To achieve the above object, an image encoding method according to the present invention comprises: a first prediction step of predicting the pixel value of a target pixel to be encoded within an image by a first prediction method; a first comparison step of comparing a prediction value predicted in the first prediction step with the pixel value of the target pixel; a step of, when the prediction value and the pixel value of the target pixel match in the first comparison step, encoding and outputting identification information for identifying the first prediction method; a second prediction step of, when the prediction value predicted by the first prediction method and the pixel value of the target pixel do not match in the first comparison step, performing prediction by a prediction method other than the first prediction method; a second comparison step of comparing a prediction value predicted by a prediction method other than the first prediction method with the pixel value of the target pixel; and a step of, when one of prediction values predicted in the second comparison step and the pixel value of the target pixel match, encoding and outputting identification information for identifying the pertinent pixel value prediction method, and when it is determined that any of the prediction values does not match the pixel value of the target pixel, calculating an error between the pixel value of the target pixel and a prediction value predicted by a predetermined prediction method and encoding and outputting the calculated error.

The present invention is based on the following knowledge. That is, in the case where pixels around a target pixel are used as a prediction method, the relationship between prediction values and a target pixel value was examined with respect to an image generated by a PDL processing system. As a result, it was found that a prediction value of a first prediction matched the pixel value of the target pixel with a probability of about 90%. This is because a graphic description by PDL is made to specify a graphic contour (triangle in this example) and paint the inside, as shown in FIG. 8. In more detail, it is conceivable that this is because prediction values obtained by using the values of surrounding pixels often match the value of a target pixel since identical pixel values are two-dimensionally continuous in the inside of one figure. Accordingly, by first obtaining only prediction values and determining whether they match the pixel values of target pixels, processing for many pixels can be omitted.

Hence, in this configuration, images generated by a PDL processing system can be encoded fast.

The higher the resolution of an output apparatus, the greater the number of pixels contained in one figure. Therefore, a first prediction value matches the pixel value of a target pixel with a higher probability. This method is more effective because a higher resolution generally requires more time for compression.

Since pixel values are often continuous as to many pixels, processing can be faster performed by comparing prediction values by a first prediction for many contiguous pixels with the pixel values of a target pixel and following pixels at a time, instead of processing one pixel at a time. Since some computer systems provide instructions to compare memory blocks or library functions, comparisons among contiguous pixels can be fast performed.

It is found that by interchanging the order of prediction methods when a match is found in second and subsequent predictions, a prediction value by a first prediction matches the pixel value of a target pixel with a higher probability.

As far as a prediction method is designed to refer to an immediately left pixel and prediction is correct on a target pixel, identical pixels values are continuous and the pixel values are unchanged. Accordingly, prediction on a pixel basis can be omitted.

It has been conventionally necessary to check the end of a line (scan line) for each pixel. However, by appending a value not matching prediction values by any prediction method to the end of a line, line end checking and the comparison between a prediction value and a target pixel value can be performed at the same time, so that processing is sped up.

The present invention can also be implemented as an image encoding apparatus or computer program product.

DESCRIPTION OF THE PREFERRED EMBODIMENTS

Hereinafter, preferred embodiments of the present invention will be described with reference to the accompanying drawings. The embodiments described hereinafter can be implemented as programs executed in a computer system or a subsystem thereof. For example, they are implemented as image encoding applications executed in the computer system or support programs (library) used by high level applications. Of course, the embodiments may also be configured as image encoding apparatuses or a part thereof by discretely assembling circuit elements or as ASIC (application specific integrated circuit) or dedicated board.

First Embodiment

Figure 9:
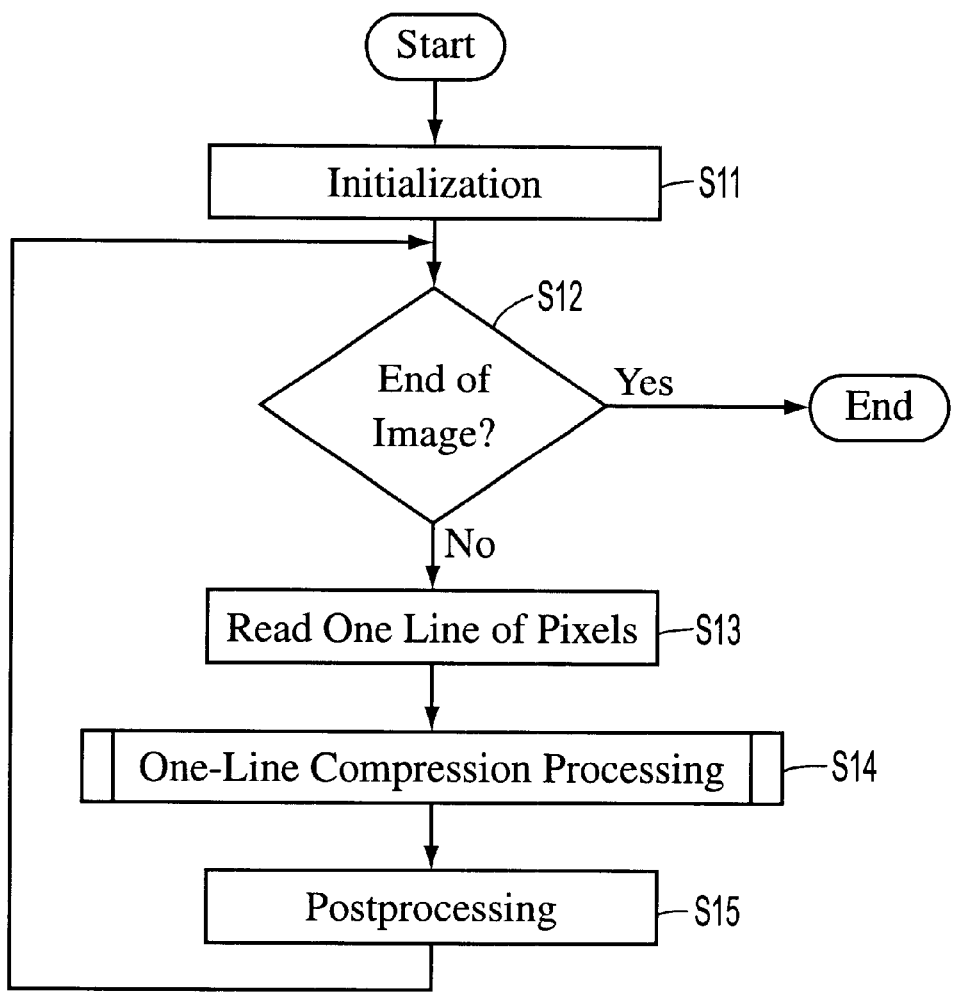
FIG. 9 is a flowchart showing the overall operation of a first embodiment of the present invention.
Figure 10:
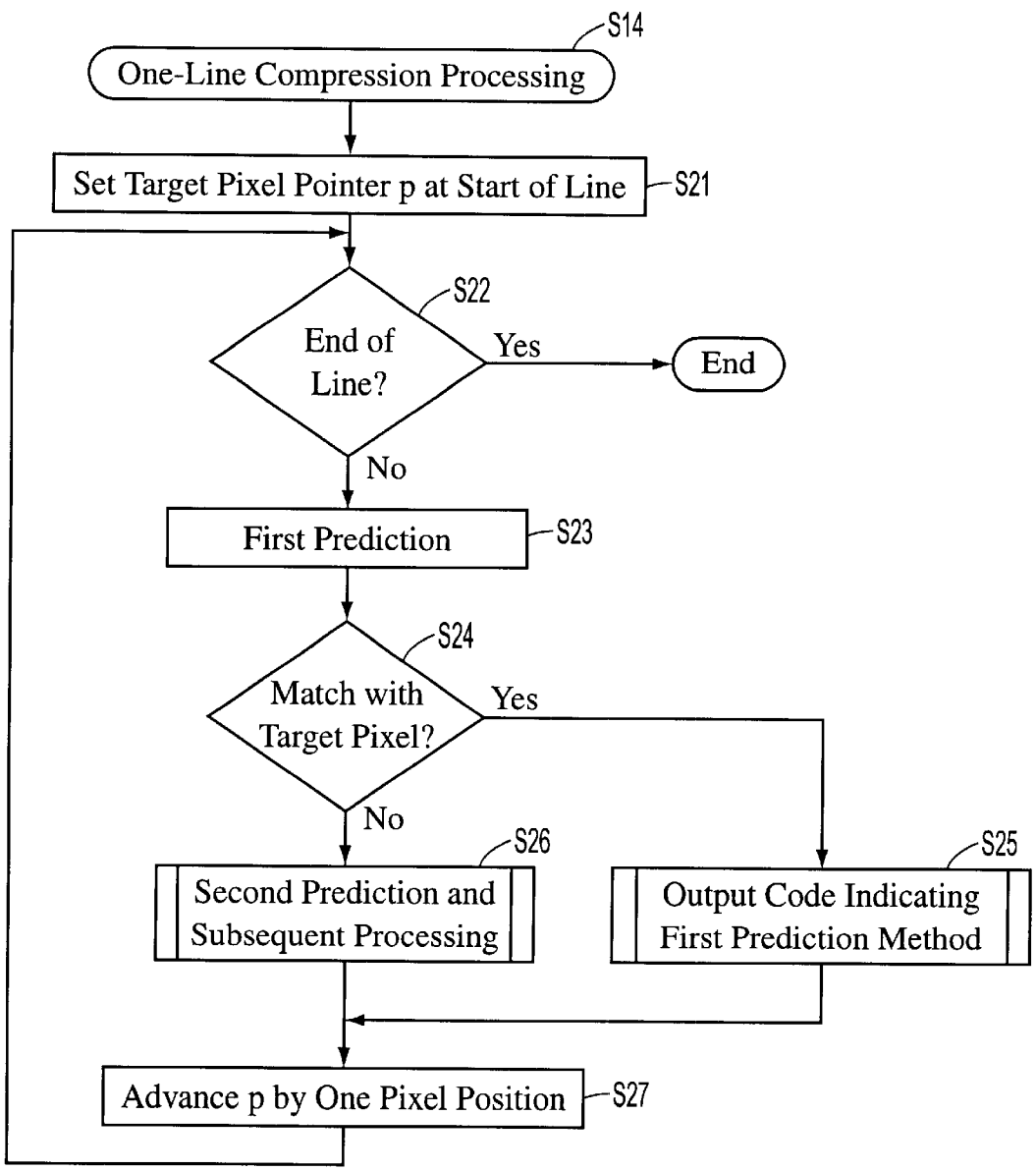
FIG. 10 is a flowchart showing the main operation of the first embodiment of the present invention.
Figure 11:
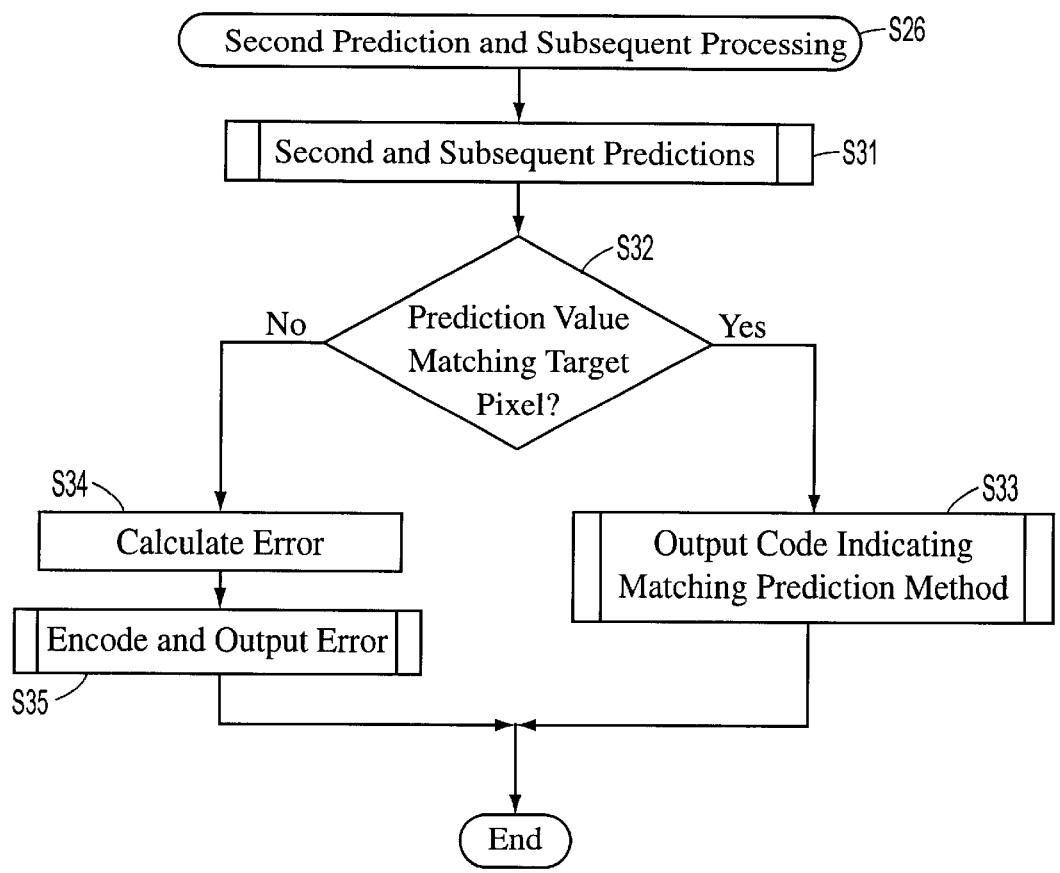
FIG. 11 is a flowchart showing in detail a part of the operation of FIG. 10.

FIGS. 9, 10, and 11 are flowcharts showing one embodiment of the present invention.

FIG. 9 is a flowchart showing processing for one image, which repeats reading and compression processing for all lines (scan lines) making up the image. Processing of FIG. 9 is as described below.

[Step S11] Initialization

[Step S12] Determine whether processing for all pixels of the image terminates. If the last pixel has been encoded, transfer to the end routine. If there are unprocessed pixels, execute step S13 and subsequent steps.

[Step S13] Read one line of the image.

[Step S14] Perform encoding processing (compression processing) for one line. Details of the processing are given in FIGS. 10 and 11.

[Step S15] Upon termination of compression processing for one line, perform post-processing.

FIG. 10 shows details of compression processing for one line. The processing is as described below.

[Step S21] First, set target pixel pointer p at the start of line.

[Step S22] Determine the end of line. That is, compare the value of target pixel pointer with the address of the last pixel of line, and if one line ends, terminate processing. Otherwise, execute step S23 and subsequent steps.

Figure 12:
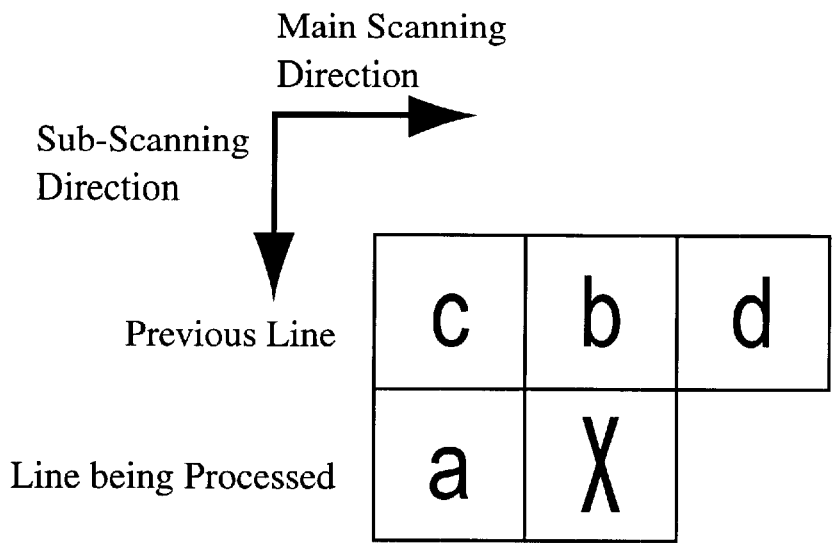
FIG. 12 is a diagram for explaining a prediction method of the first embodiment of the present invention.

[Step S23] Perform prediction based on a first prediction method and obtain a prediction value. The prediction method uses the values of pixels around a target pixel or the result of operating them. For example, as shown in FIG. 12, use the values of immediately preceding a, immediately upper b, upper left c, and upper right d pixels with respect to a target pixel X. Which is to be used as the first prediction may be fixed or adaptively changed.

[Step S24] Determine whether the result of the first prediction matches the pixel value of the target pixel.

[Step S25] If the result of the first prediction matches the pixel value of the target pixel in step S24, output code indicating the first prediction method.

[Step S26] If the result of the first prediction is found not to match the pixel value of the target pixel in step S24, perform second and subsequent predictions for the first time. Details of the predictions are given in FIG. 11.

[Step S27] Advance pointer p by one pixel position. Then, return to step S22.

FIG. 11 shows second and subsequent prediction processing. The processing is as described below.

[Step S31] Perform prediction based on a second prediction method and subsequent prediction methods and obtain a plurality of prediction values.

[Step S32] Compare the obtained prediction values with the value of target pixel.

[Step S33] If there is a matching prediction method, output a code indicating the prediction method.

[Steps S34 and S35] If no match is found, encode and output the target pixel itself. In this case, processing is performed as it has been conventionally performed.

When one pixel has been thus encoded, advance the pointer indicating a target pixel to return to the start of the loop (S22 in FIG. 10).

In this embodiment, since prediction by other prediction methods is not performed so long as a prediction value of the first prediction method matches the pixel value of a target pixel, processing is sped up accordingly.

Second Embodiment

Next, a second embodiment will be described. In this embodiment, when a prediction value of the first prediction method does not match a target pixel value and a prediction value of second or subsequent prediction matches the target pixel value, the order of the prediction methods is interchanged.

In this embodiment, a table (FIG. 14) managing the order of prediction methods is provided, and when a match is found in second and subsequent predictions, processing is performed to interchange the prediction methods.

Figure 13:
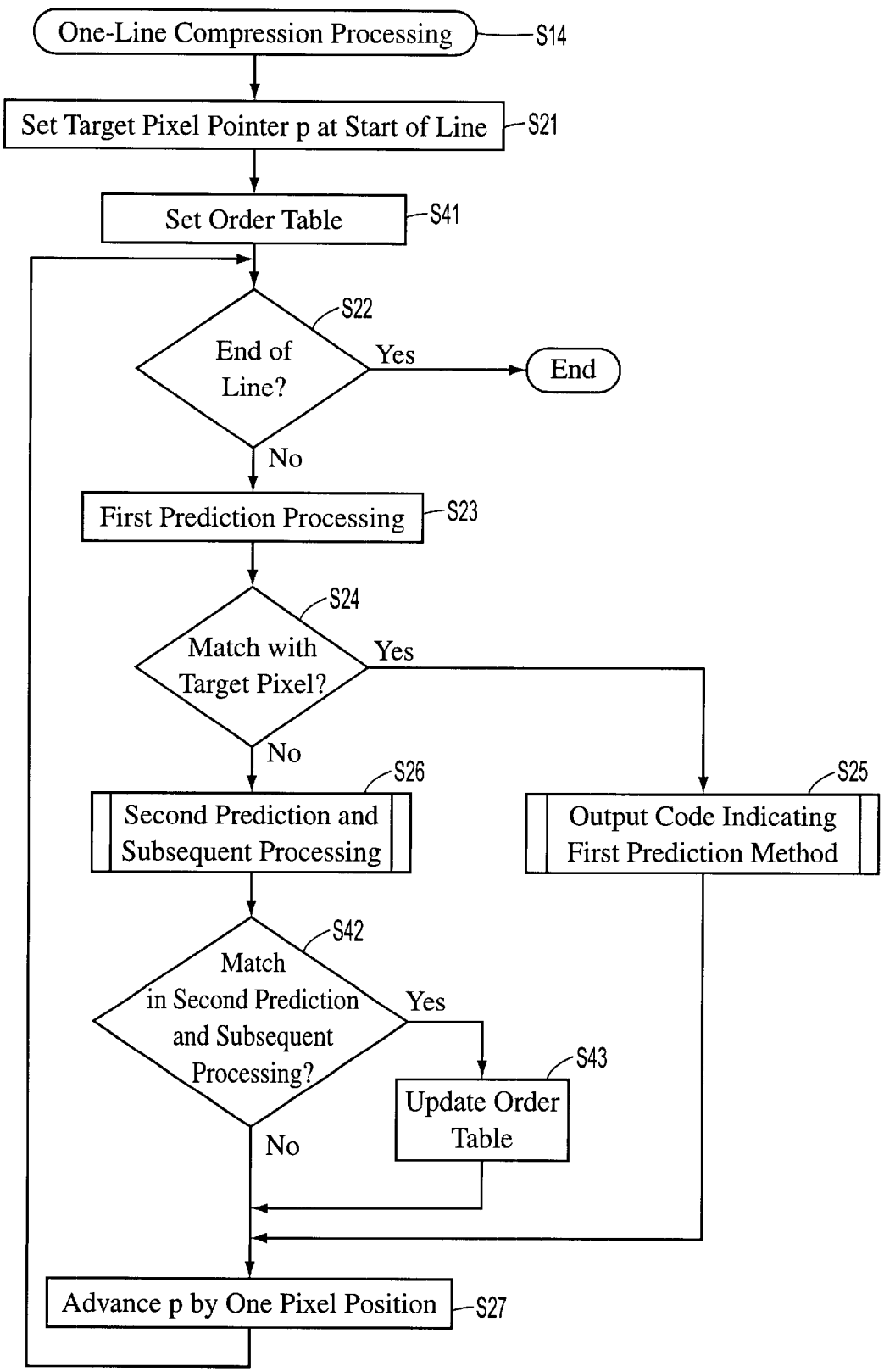
FIG. 13 is a flowchart showing the overall operation of a second embodiment of the present invention.

FIG. 13 shows the main operation (one-line compression processing) of the embodiment. Processing shown in FIG. 13 corresponds to processing explained in FIG. 10 in relation to the first embodiment. In FIG. 13, locations corresponding to those in FIG. 10 are assigned corresponding reference numerals. Processing specific to the second embodiment is processing of steps S41, S42, and S43.

One-line compression processing in the second embodiment is as described below.

Figure 14:
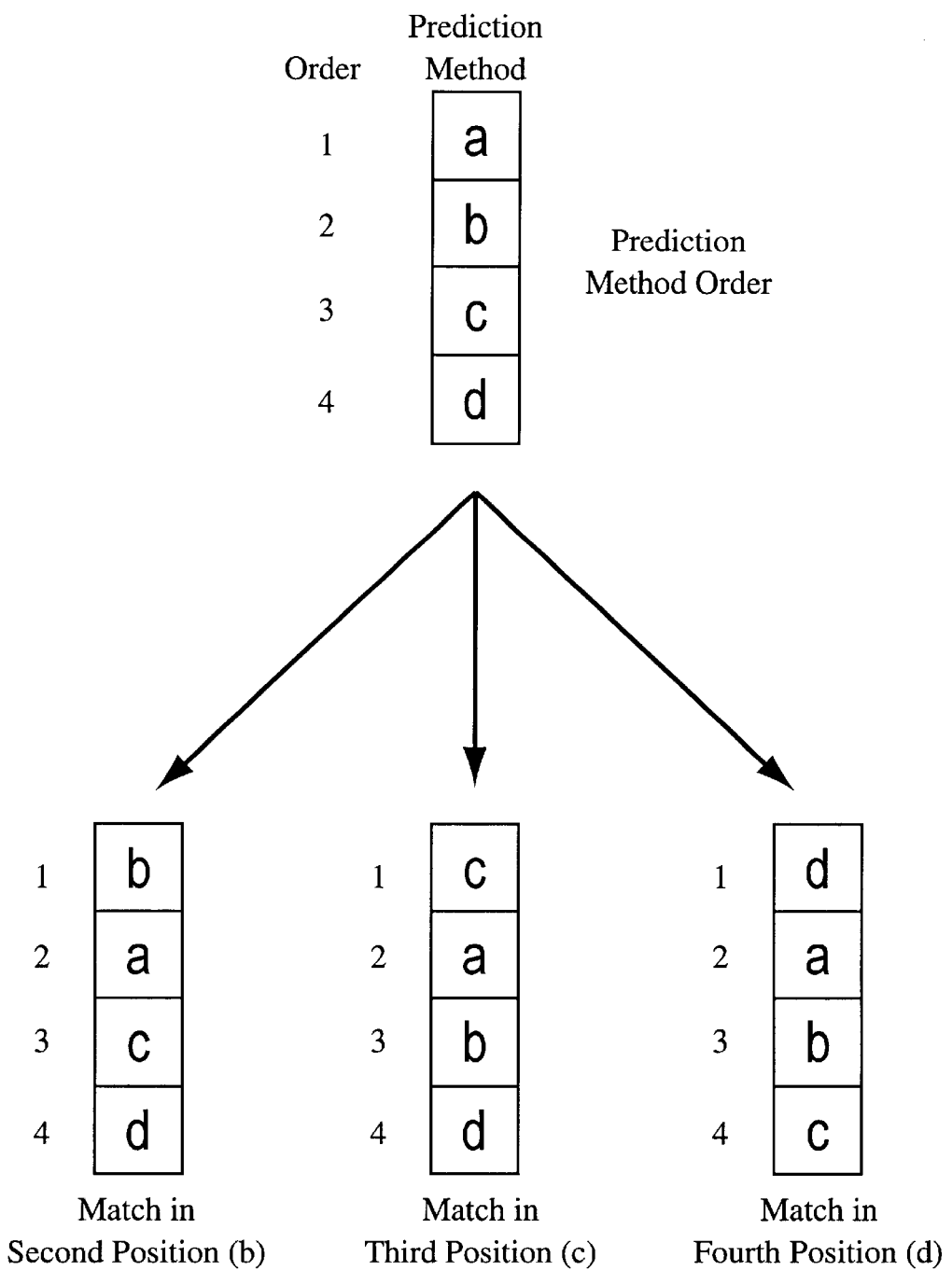
FIG. 14 is a diagram for explaining a change of an order table in the second embodiment of the present invention.

[Step S21] First, set target pixel pointer p at the start of line.
[Step S41] Set an order table as shown in FIG. 14. An initial order may be fixed or adaptively set by some rules.
[Step S22] Determine the end of line. That is, compare the value of target pixel pointer with the address of the last pixel of line, and if the line ends, terminate processing. Otherwise, execute step S23 and subsequent steps.
[Step S23] Perform prediction based on a first prediction method and obtain a prediction value. The prediction method uses the values of pixels around a target pixel or the result of operating them. For example, as shown in FIG. 12, use the values of immediately preceding a, immediately upper b, upper left c, and upper right d pixels with respect to a target pixel X. Which is to be used as the first prediction may be fixed or adaptively changed.
[Step S24] Determine whether the result of the first prediction matches the pixel value of the target pixel.
[Step S25] If the result of the first prediction matches the pixel value of the target pixel in step S24, output code indicating the first prediction method.
[Step S26] If the result of the first prediction does not match the pixel value of the target pixel in step S24, perform second and subsequent predictions. Details of the predictions are given in FIG. 11.
[Step S42] Determine whether a prediction value obtained by a second or subsequent prediction method matches the value of a target pixel. If not, proceed to step S27, and if so, proceed to step S43.
[Step S43] To make the matching prediction method a first prediction method, change the prediction order table. For example, as shown in FIG. 14, put the matching method in the first position and put the old first method in the second position. Lower the order of second and subsequent methods if necessary.
[Step S27] Advance pointer p by one pixel position. Then, return to step S22.

In this embodiment, since a first prediction method is adaptively changed, the probability of a hit in the first prediction method becomes higher, enabling faster processing.

Third Embodiment

Next, a third embodiment will be described. In this embodiment, a counter is provided to count the number of matches between prediction values of a first prediction method and the pixel value of target pixel, and when a prediction value of the first prediction method matches the pixel value of target pixel, the counter is increased and no code is outputted. If the counter is not 0 when there is no match with a prediction value of the first prediction method or when a line ends, a code indicating the first prediction method is outputted the number of times indicated by the counter.

Figure 15:
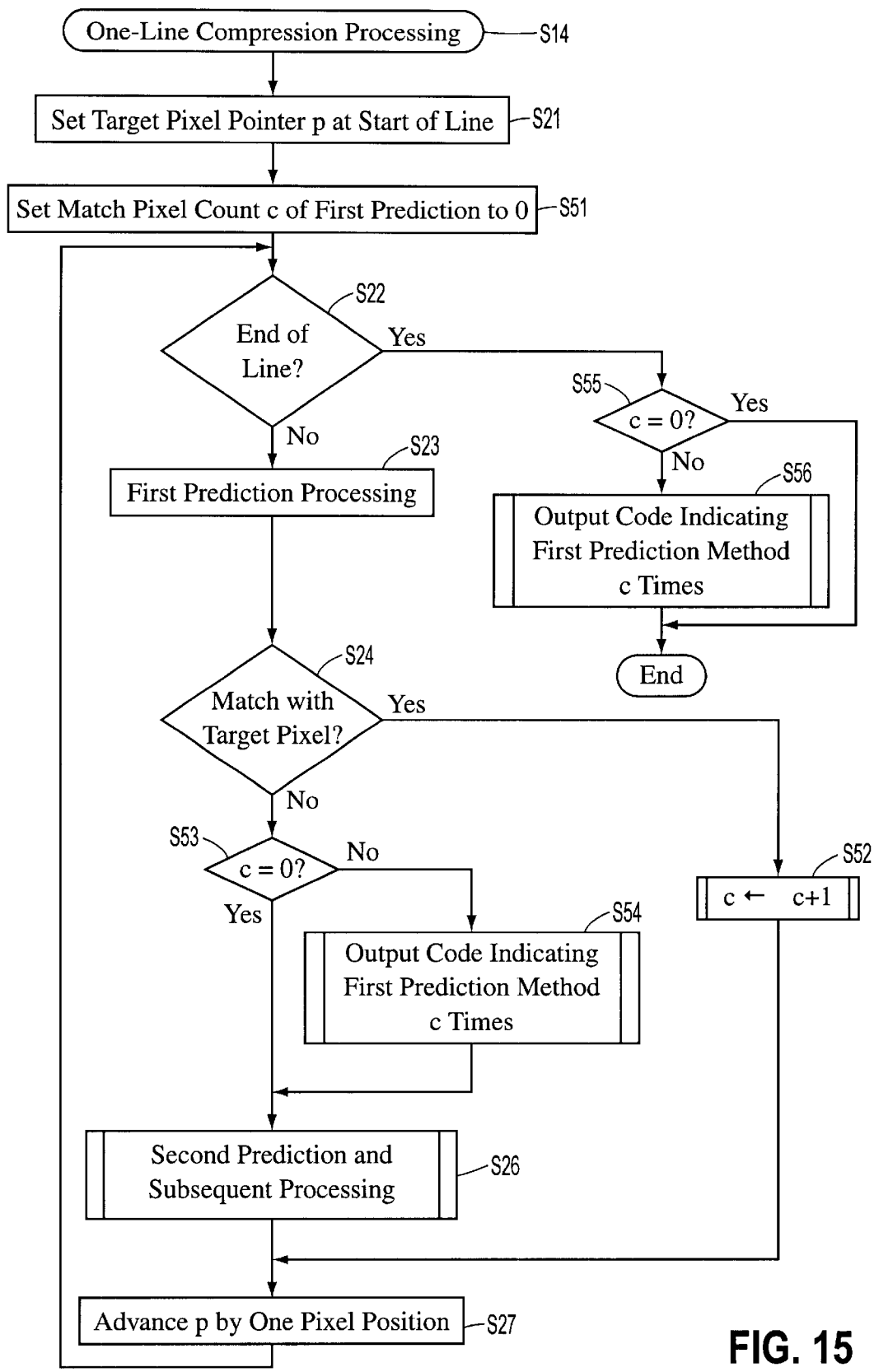
FIG. 15 is a flowchart showing the overall operation of a third embodiment of the present invention.

FIG. 15 shows the main operation (one-line compression processing) of this embodiment. In FIG. 15, locations corresponding to those in FIG. 10 are assigned corresponding reference numerals. Processing specific to this embodiment is processing of steps S51 to S56.

One-line compression processing in the second embodiment is as described below.

[Step S21] First, set target pixel pointer p at the start of line.
[Step S51] Initialize to zero a match pixel count c representing the number of pixels in which a first prediction method predicted the pixel value successfully.
[Step S22] Determine the end of line. That is, compare the value of target pixel pointer with the address of the last pixel of line, and if the line ends, perform steps S55 and S56 of post-processing and terminate processing. Otherwise, execute step S23 and subsequent steps.
[Step S23] Perform prediction based on a first prediction method and obtain a prediction value. The prediction method uses the values of pixels around a target pixel or the result of operating them. For example, as shown in FIG. 12, use the pixel values of immediately preceding a, immediately upper b, upper left c, and upper right d pixels with respect to a target pixel X. Which is to be used as the first prediction may be fixed or adaptively changed.
[Step S24] Determine whether the result of the first prediction matches the pixel value of the target pixel.
[Step S52] If the result of the first prediction matches the pixel value of the target pixel in step S24, increment the match pixel count c by 1. Then, proceed to step S27.
[Step S53] If the result of the first prediction does not match the pixel value of the target pixel in step S24, determine whether the match pixel count c is zero. If zero, skip step S54 and proceed to step S26. If not zero, proceed to step S54.
[Step S54] Output code c indicating the first prediction method c times.
[Step S26] If the result of the first prediction does not match the pixel value of the target pixel in step S24, perform second and subsequent predictions. Details of the predictions are given in FIG. 11.
[Step S27] Advance pointer p by one pixel position. Then, return to step S22.
[Step S55] This step performs post-processing at the end of one line. Determine whether the match pixel count c is zero. If zero, processing terminates without performing step S56.
[Step S56] If the match pixel count c is not zero, output code indicating the first prediction method c times.

Fourth Embodiment

Next, a fourth embodiment will be described. Although this embodiment is similar to the third embodiment in that when a counter is provided, a code is outputted with the value of the counter encoded for output. Since a first prediction method often finds match continuously, output processing is further reduced in amount and sped up.

Figure 16:
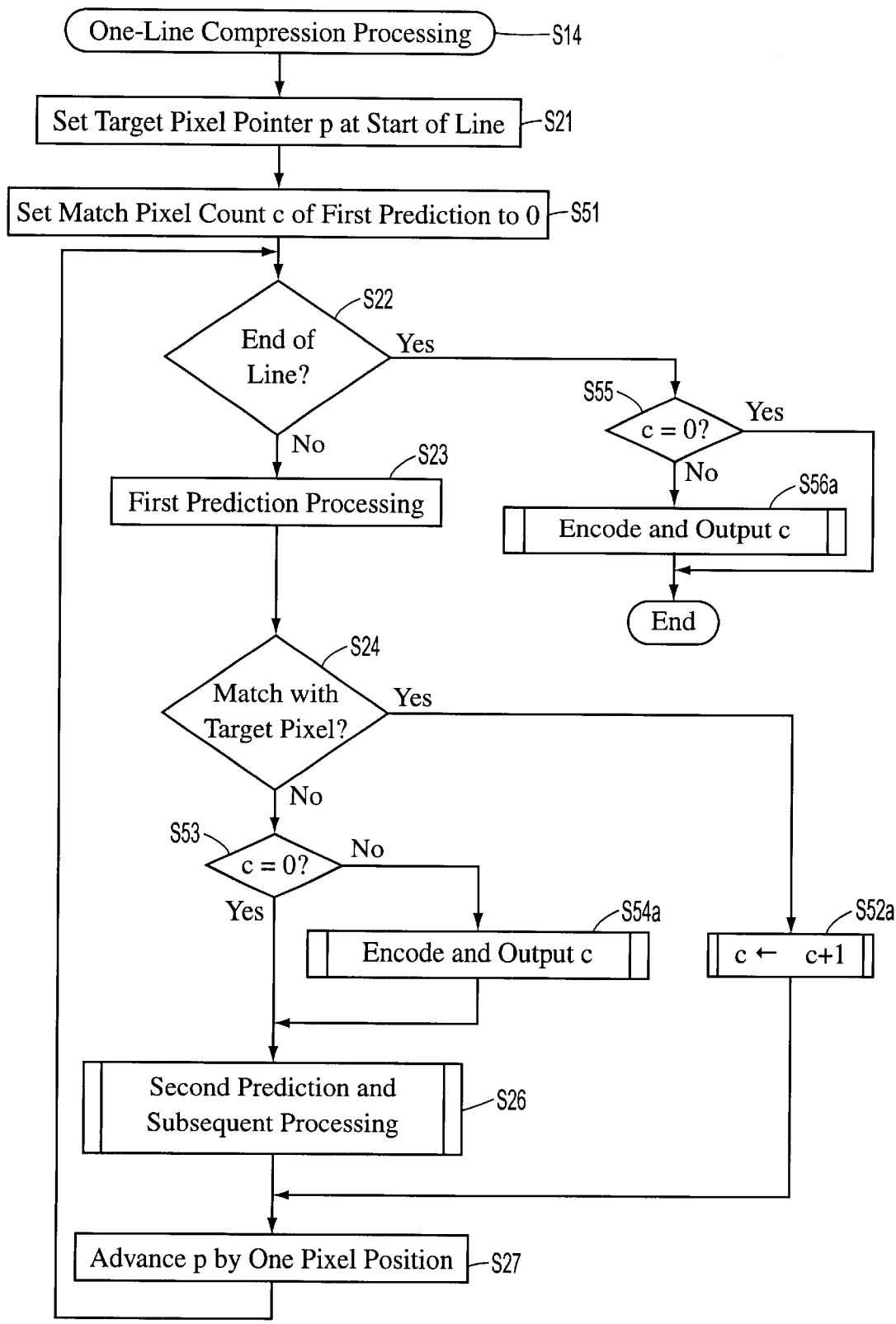
FIG. 16 is a flowchart showing the overall operation of a fourth embodiment of the present invention.

FIG. 16 shows the main operation (one-line compression processing) of this embodiment. In FIG. 16, locations corresponding to those in FIG. 15 are assigned corresponding reference numerals. Processing specific to this embodiment is processing of steps S52a and S56a. That is, in steps S52 and S56 of FIG. 15, a code indicating a first prediction method is outputted c times, while in steps S52a and S56a of this embodiment, count c is encoded for output. Details of other operations are omitted because they are the same as those in the third embodiment.

Fifth Embodiment

Next, a fifth embodiment will be described. In this embodiment, instead of counting the number of hits by a first prediction method, a target pixel pointer is used to obtain the number of hits. For this reason, a pointer for recording the position of a pixel in which a first prediction method predicted unsuccessfully is newly provided, and the pointer is not changed if a prediction value by the first prediction method matches the pixel value of a target pixel. By this arrangement, when a prediction value by the first prediction method does not match the pixel value of target pixel, the number of matching pixels can be obtained by determining the difference between the pointer value and the target pixel pointer value. This can eliminate a counter-incrementing operation, enabling faster processing.

Figure 17:
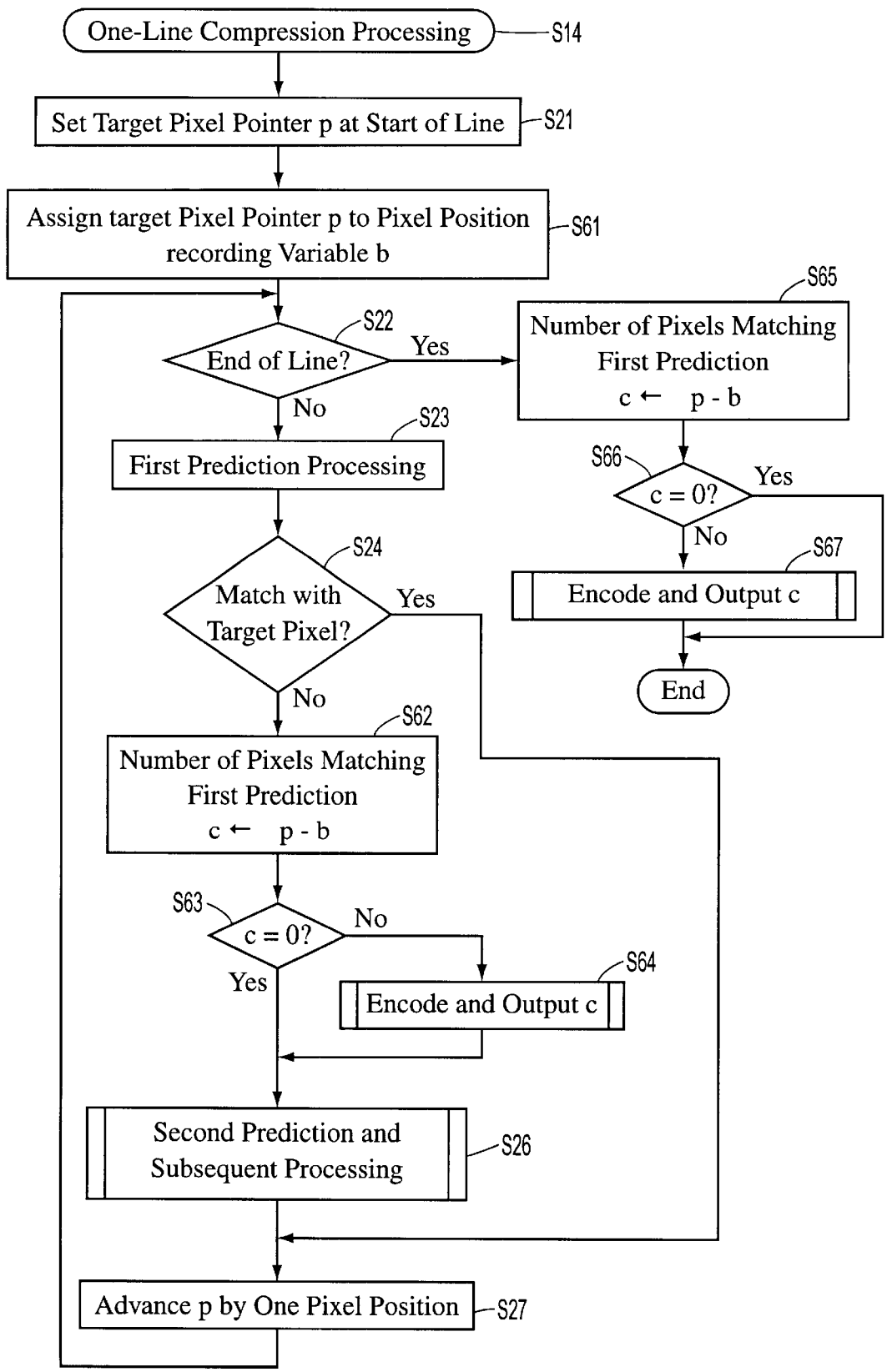
FIG. 17 is a flowchart showing the overall operation of a fifth embodiment of the present invention.

FIG. 17 shows the main operation (one-line compression processing) of this embodiment. In FIG. 17, locations corresponding to those in FIG. 15 are assigned corresponding reference numerals. Processing specific to this embodiment is processing of steps S61 to S57.

One-line compression processing in the fifth embodiment is performed as described below.

[Step S21] First, set target pixel pointer p at the start of line.
[Step S61] Assign the target pixel pointer p to a pixel position recording variable b.
[Step S22] Determine the end of line. That is, compare the value of target pixel pointer with the address of the last pixel of line, and if the line ends, proceed to steps S65 to S67 to perform post-processing. Otherwise, execute step S23 and subsequent steps.
[Step S23] Perform prediction based on a first prediction method and obtain a prediction value. The prediction method uses the values of pixels around a target pixel or the result of operating them. For example, as shown in FIG. 12, use the pixel values of immediately preceding a, immediately upper b, upper left c, and upper right d pixels with respect to a target pixel X. Which is to be used as the first prediction may be fixed or adaptively changed.
[Step S24] Determine whether the result of the first prediction matches the pixel value of the target pixel.
[Step S25] If the result of the first prediction matches the pixel value of the target pixel in step S24, skip steps S62 to S64 and S26 to proceed to step S27.
[Step S62] If the result of the first prediction does not match the pixel value of the target pixel in step S24, subtract the pixel position recording variable b from the target pixel pointer p, assign a resulting value to the match pixel count c, and proceed to step S63.
[Step S63] Determine whether the match pixel count c is zero, and if not zero, proceed to step S64; otherwise, skip step S64 and proceed to step S26.
[Step S64] Encode the match pixel count c.
[Step S26] Perform second and subsequent predictions. Details of the predictions are given in FIG. 11.
[Step S27] Advance the pointer p by one pixel position. Then, return to step S22.
[Step S65] Since processing for the line terminates, perform post-processing. Assign, to the match pixel count c, a value resulting from subtracting the pixel position recording variable b from the target pixel pointer p.
[Step S66] Determine whether the match pixel count c is zero, and if not zero, proceed to step S64; otherwise, skip step S67 and terminate processing.
[Step S67] Encode the match pixel count c and terminate processing.

Sixth Embodiment

Next, a sixth embodiment will be described. In this embodiment, processing is sped up by performing line end checking and the comparison between a prediction value by a first prediction method and a target pixel value at the same time.

To achieve this, a space for storing two pixels is allocated in a buffer for accommodating each line. Before beginning processing for each line, a value not matching any prediction value generated by prediction methods is set in a position next to a buffer position to store the last pixel of line. This value is obtained as described below, for example. For explanatory purposes, four points, left, upper left, upper, and upper right with respect to a target pixel are used as a prediction method.

Figure 19:
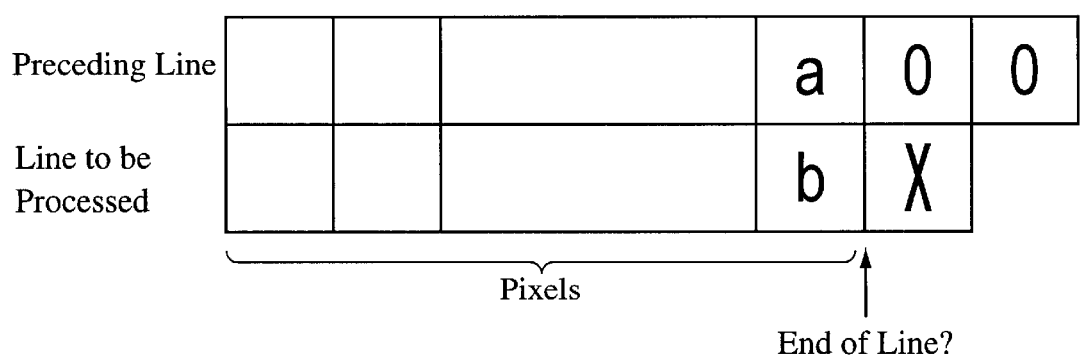
FIG. 19 is a diagram for explaining line end detection in the sixth embodiment of the present invention.

As shown in FIG. 19, letting a pixel next to the last pixel be X, the last pixel is b, the last pixel of a preceding line is a, and zero is set in an area to store the last two pixels of the preceding line. In this case, when X is a target pixel, since a, b, and 0 are obtained as prediction values, a numeric value other than the three values is set in X.

By this arrangement, since a target pixel comes out of a line without matching any prediction value, it can be determined that a line terminates only when there is no match with any prediction value.

Figure 18:
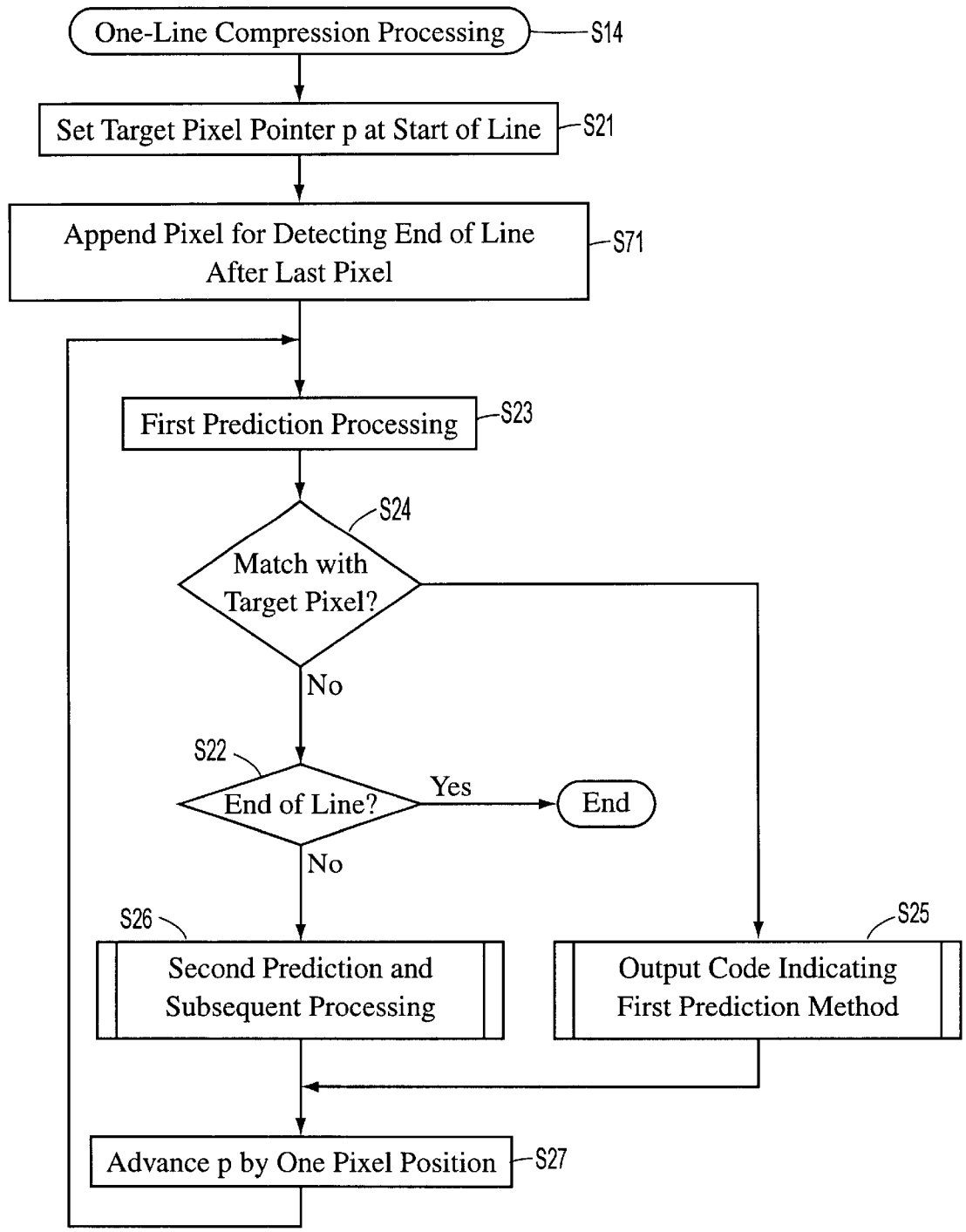
FIG. 18 is a flowchart showing the overall operation of a sixth embodiment of the present invention.

FIG. 18 shows the main operation (one-line compressing processing) of this embodiment. In FIG. 18, locations corresponding to those in FIG. 9 are assigned corresponding reference numerals. Processing specific to this embodiment is processing of step S71.

One-line compression processing in the sixth embodiment is performed as described below.

[Step S21] First, set target pixel pointer p at the start of line.
[Step S71] Append a pixel for detecting the end of line after the end of line.
[Step S23] Perform prediction based on a first prediction method and obtain a prediction value. The prediction method uses the values of pixels around a target pixel or the result of operating them. For example, as shown in FIG. 10, use the pixel values of immediately preceding a, immediately upper b, upper left c, and upper right d pixels with respect to a target pixel X. Which is to be used as the first prediction may be fixed or adaptively changed.
[Step S24] Determine whether the result of the first prediction matches the pixel value of the target pixel.
[Step S25] If the result of the first prediction matches the pixel value of the target pixel in step S24, output a code indicating the first prediction method.
[Step S22] If the result of the first prediction does not match the pixel value of the target pixel in step S24, determine whether the line ends. If not, proceed to step S26.
[Step S26] Perform second and subsequent predictions. Details of the predictions are given in FIG. 9.
[Step S27] Advance pointer p by one pixel position. Then, return to step S22.

Seventh Embodiment

Next, a seventh embodiment will be described. In this embodiment, processing is sped up by omitting prediction when a first prediction method uses a left pixel value. The fact that the first prediction method uses a left pixel and its prediction value matches the pixel value of a target pixel means that identical pixel values are continuous. Accordingly, if the first prediction method keeps finding match, it means that the same pixel value is continuous on the line. In this case, since the prediction value is also constant without changing, if it is saved, prediction processing can also be omitted. Compression processing can be sped up particularly for an image described in PDL, in which an identical pixel value often appears continuously.

Figure 1:
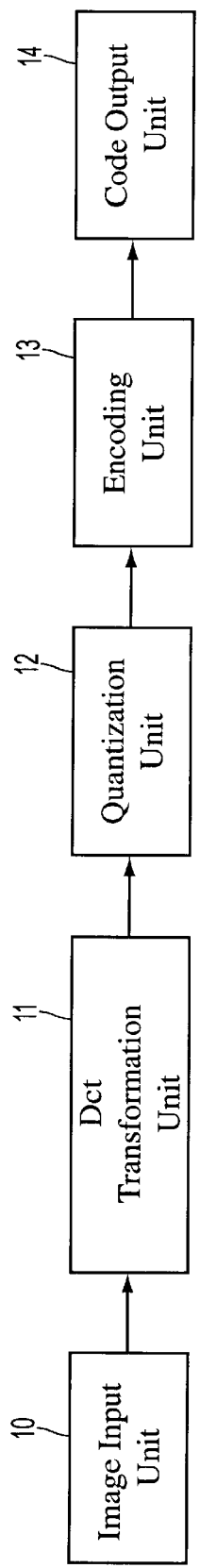
FIG. 1 is a block diagram showing an image encoding apparatus of a conventional JPEG base line system.
Figure 2:
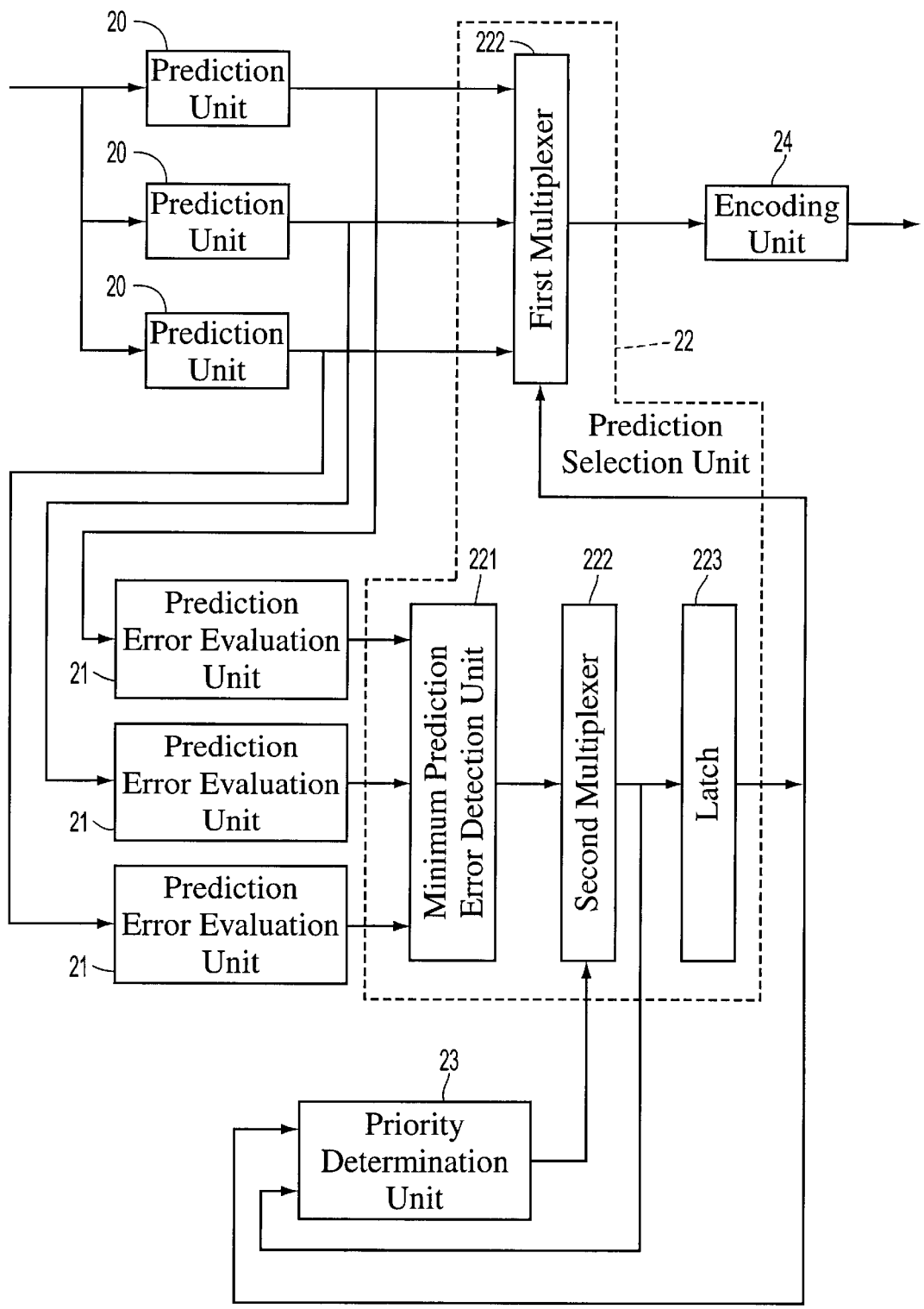
FIG. 2 is a block diagram showing another conventional image encoding apparatus.
Figure 3A:
FIG. 3 is a diagram for explaining a prediction method of the image encoding apparatus of FIG. 2.
Figure 3B:
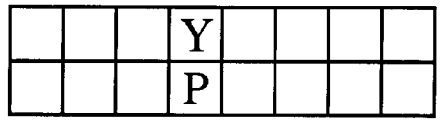
Figure 3C:
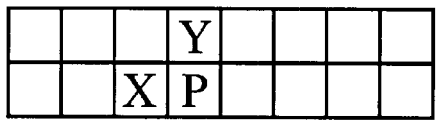
Figure 20:
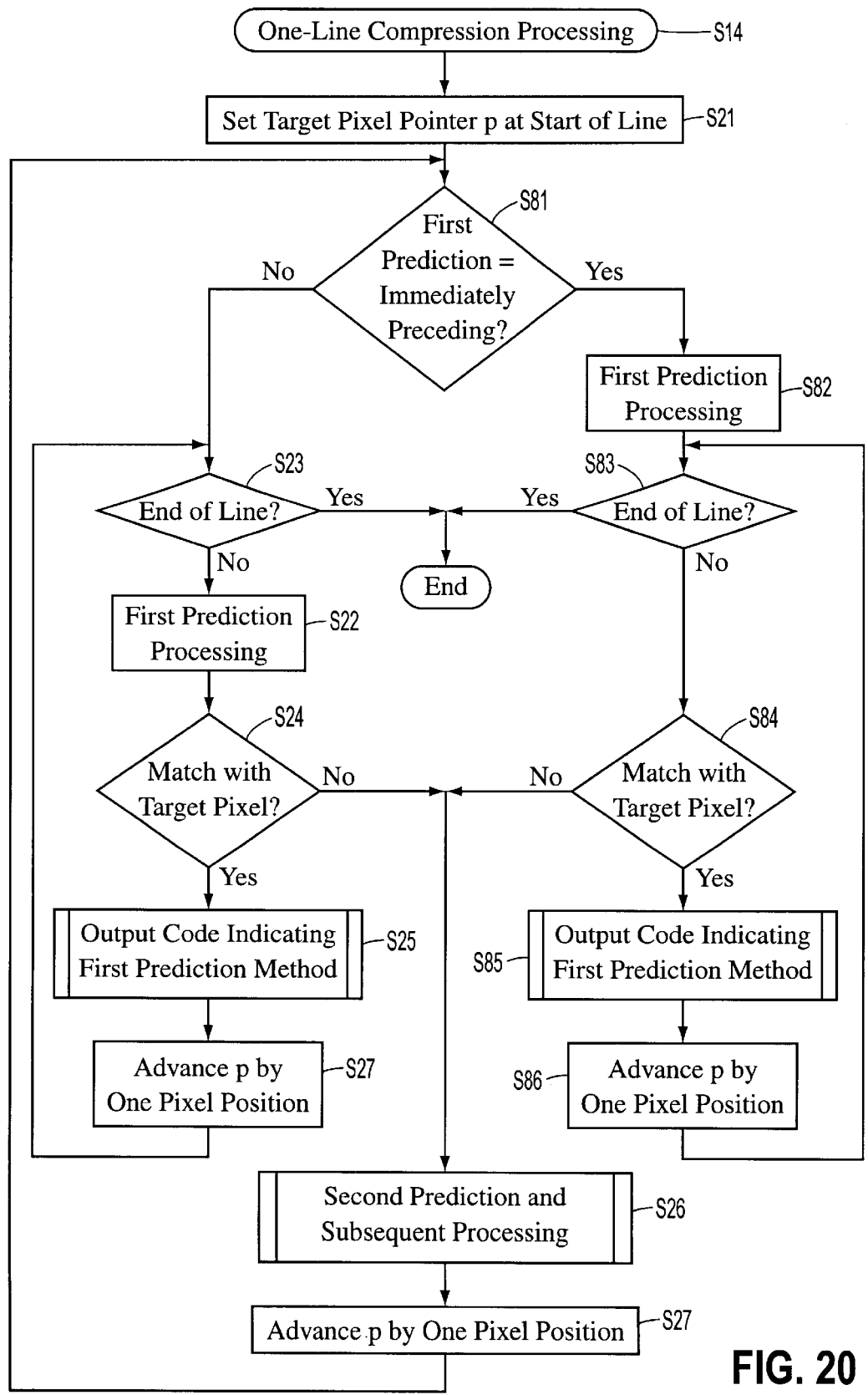
FIG. 20 is a flowchart showing the overall operation of a seventh embodiment of the present invention.

FIG. 20 shows the main operation (one-line compression processing) of this embodiment. In FIG. 20, locations corresponding to those in FIG. 10 are assigned corresponding reference numerals. Processing specific to this embodiment is processing of steps S81 to S86. Processing of steps S81 to S86 is performed when a first prediction method uses the pixel value of an immediately preceding pixel. Other processing is the same as processing of steps S21 to S27 in FIG. 1.

Of processing of the seventh embodiment, the flow of processing when the first prediction method uses an immediately preceding pixel value is as follows.

[Step S21] First, set target pixel pointer p at the start of line.
[Step S81] Determine whether the first prediction method uses the pixel value of a left pixel (immediately preceding pixel). If so, proceed to step S82, and if not, proceed to step S22. A description of steps S22 and subsequent steps is omitted because they are the same as those in the example of FIG. 10.
[Step S82] Perform prediction based on the first prediction method to obtain a prediction value. The prediction method uses the value of a pixel immediately preceding a target pixel. Next, proceed to step S83.
[Step S83] Determine the end of line. That is, compare the value of target pixel pointer with the address of the last pixel of line, and if the line ends, terminate processing. Otherwise, execute step S84 and subsequent steps.
[Step S84] Determine whether the result of the first prediction matches the pixel value of a target pixel. If so, proceed to step S85, and if not, proceed to step S26.
[Step S85] Output a code indicating the first prediction method. Proceed to step S86.
[Step S86] Advance pointer p by one pixel position. Then, return to step S83.
[Step S26] If the result of the first prediction does not match the pixel value of a target pixel in step S84 (step S24 also), perform second and subsequent predictions. Details of the predictions are given in FIG. 11.
[Step S27] Advance pointer p by one pixel position. Then, return to step S81.

Eighth Embodiment

Next, an eighth embodiment will be described. In this embodiment, many of the characteristics of the embodiments described above are used to perform fast compression. That is, the characteristics of the second, fourth, fifth, sixth, and seventh embodiments are implemented.

Figure 21:
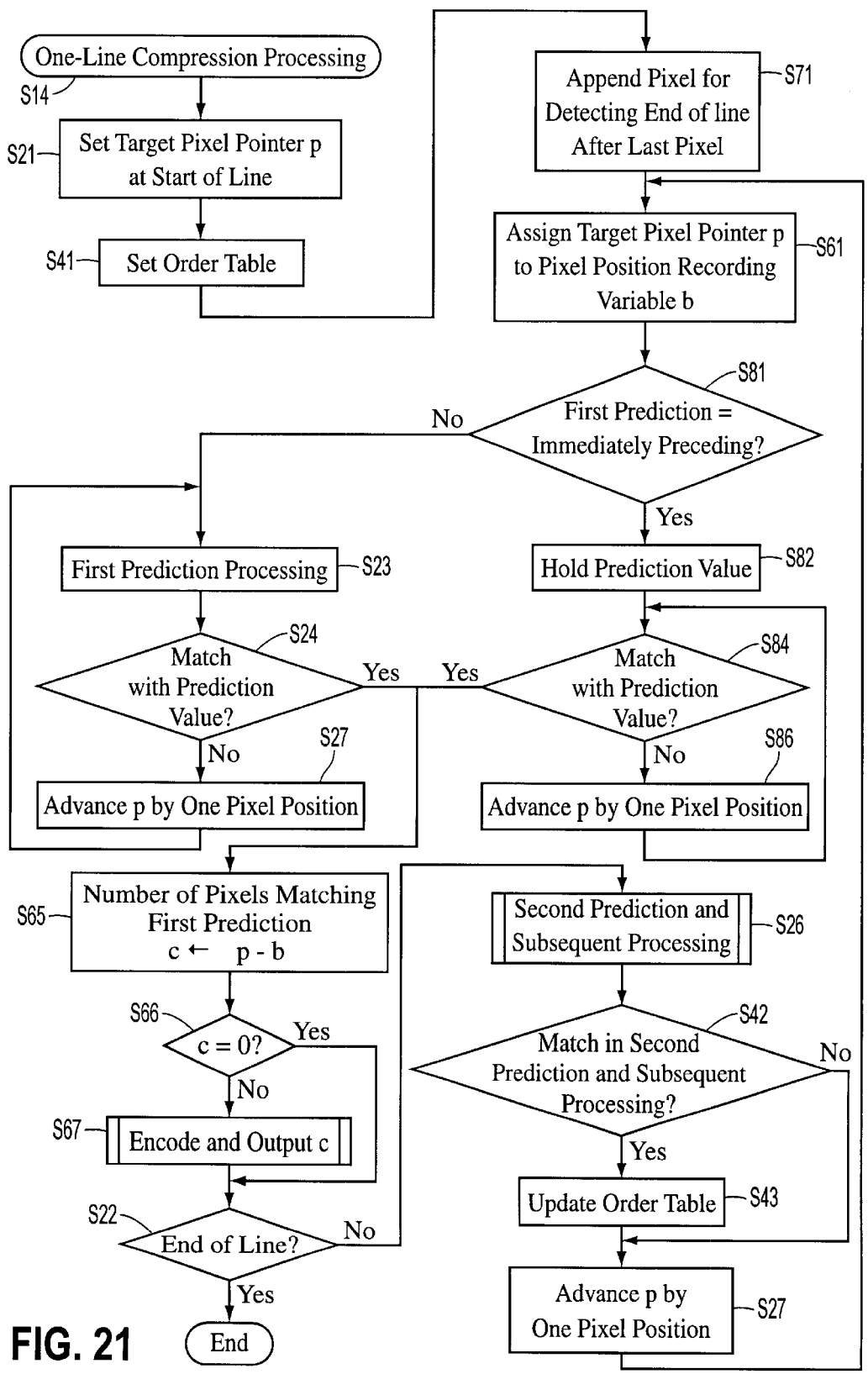
FIG. 21 is a flowchart showing the overall operation of an eighth embodiment of the present invention.

FIG. 21 shows the main operation (one-line compression processing) of this embodiment. In FIG. 21, locations corresponding to those in FIGS. 10, 13, 17, 18, and 20 are assigned corresponding reference numerals, and a detailed description is omitted.

Ninth Embodiment

Next, a ninth embodiment will be described. Some computers are provided with an instruction (block compare instruction) that permits contiguous areas to be compared at a time, or offer such a function. Although a prediction value and a target pixel value are compared on a one-pixel basis in the embodiments having been so far described, processing can be performed faster by using the instruction that permits contiguous areas to be compared at a time.

Figure 23A:
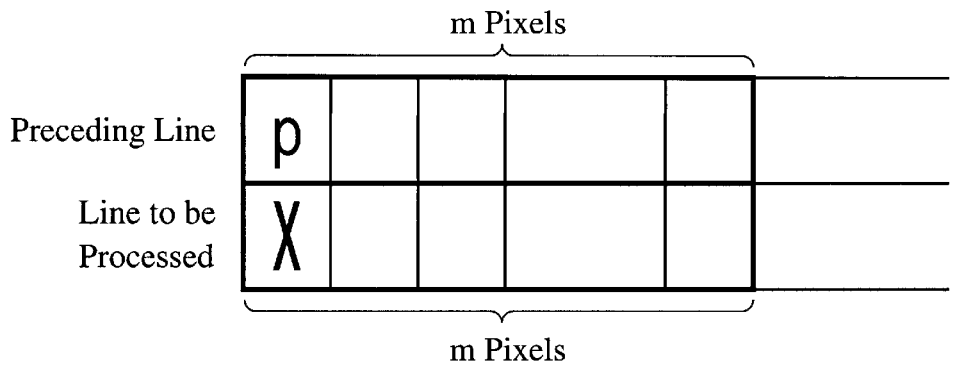
FIG. 23 is a diagram for explaining a block comparison method in a ninth embodiment of the present invention.
Figure 23B:
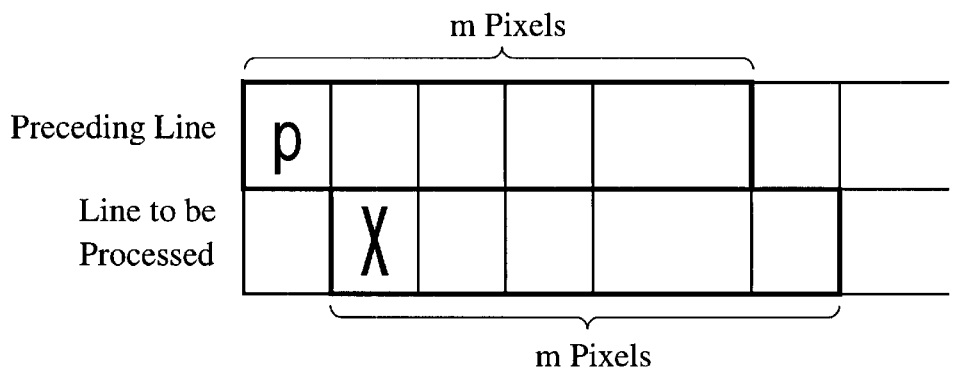
Figure 23C:
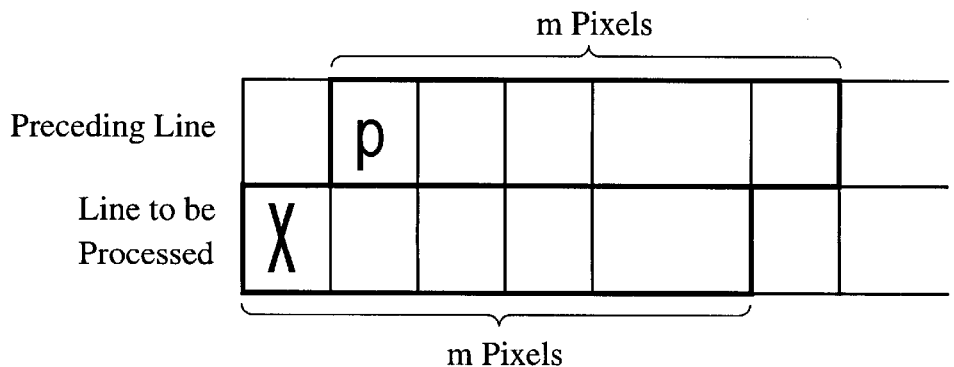
Figure 24A:
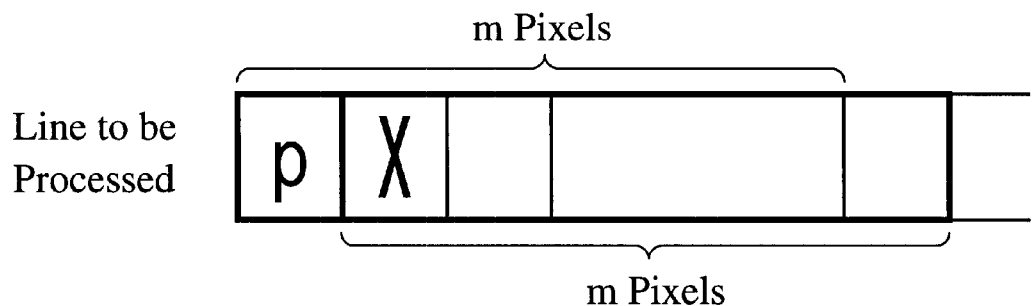
FIG. 24 is a diagram for explaining another block comparison method in a ninth embodiment of the present invention.
Figure 24B:
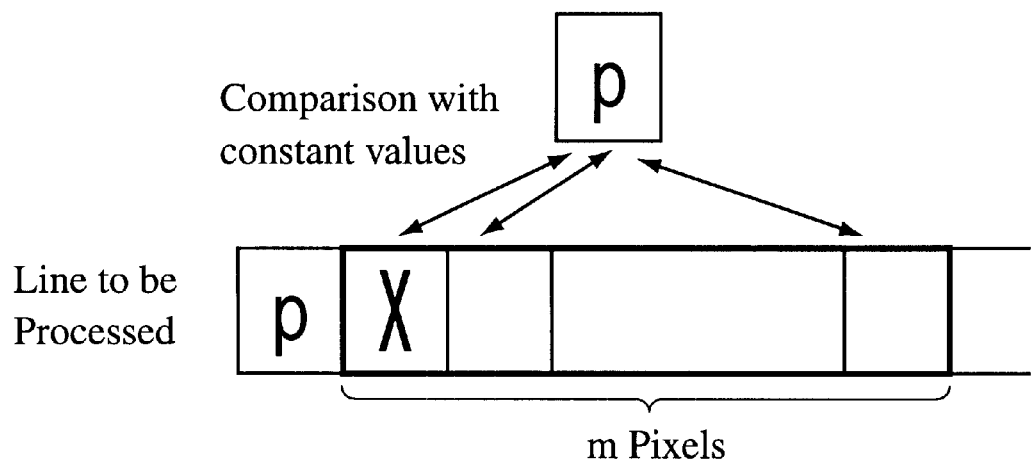

FIGS. 23 and 24 show the relationship between prediction method and comparison method. FIG. 23 shows memory blocks subjected to block comparison at m-pixel comparison by use of (a) immediately upper, (b) upper left, and (c) upper right pixels as a prediction method. FIG. 24 shows a case where the pixel value of an immediately preceding pixel is used as a prediction method; in this case, the prediction method can also be implemented by comparing overlapping memory blocks as shown in (a), or the comparison between constant values and memory blocks may also be used as shown in (b), using the fact that prediction values do not change when the prediction method uses an immediately preceding pixel.

As described above, a plurality of pixels can be processed at a time by using block comparisons, so that compression can be made faster.

Figure 22:
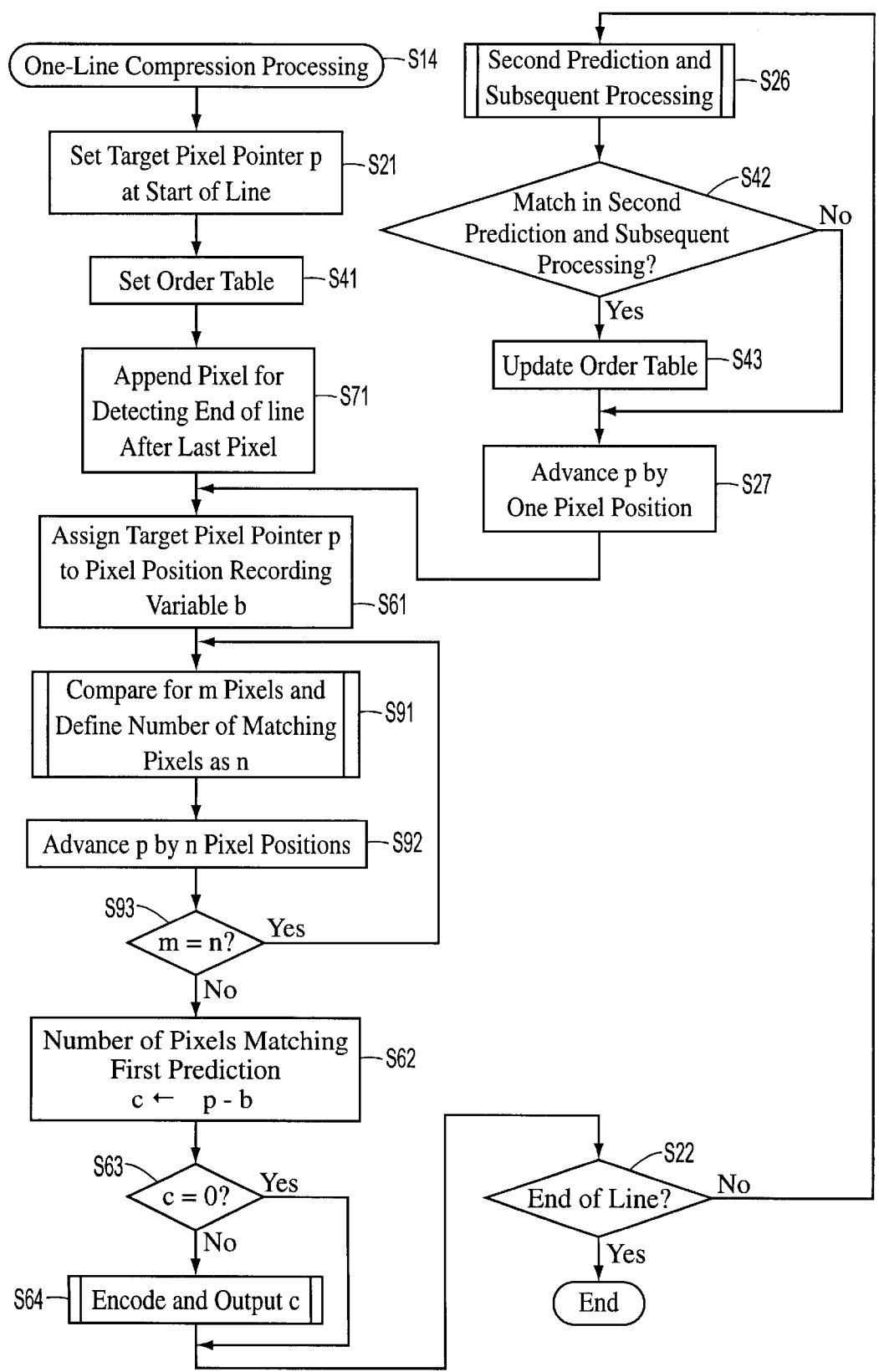
FIG. 22 is a flowchart showing the overall operation of a ninth embodiment of the present invention.

FIG. 22 shows the main operation (one-line compression processing) of this embodiment. In FIG. 22, locations corresponding to those in FIG. 17 are assigned corresponding reference numerals. Processing specific to this embodiment is processing of steps S91 to S93.

One-line compression processing in the ninth embodiment is performed as described below.

[Step S21] First, set target pixel pointer p at the start of line.
[Step S41] Set an order table of prediction methods.
[Step S71] Append a pixel for detecting the end of line after the end of line.
[Step S61] Assign target pixel pointer p to pixel position recording variable b.
[Step S91] Compare m target pixels with m pixels to be compared and find the number n of matching pixels. Proceed to step S92.
[Step S92] Advance target pixel pointer p by m pixel positions.
[Step S93] Determine whether m=n. If so, return to step S91 and repeat block comparison processing. If not, advance to step S62.
[Step S62] Subtract the pixel position recording variable b from the target pixel pointer p and assign a resulting value to match pixel count c, and proceed to step S63.
[Step S63] Determine whether the match pixel count c is zero, and if not zero, proceed to step S64; otherwise, skip step S64 and proceed to step S22.
[Step S64] Encode the match pixel count c.
[Step S22] Determine the end of line. If the line ends, terminate processing, and otherwise, execute step S26 and subsequent steps.
[Step S23] Perform prediction based on a first prediction method and obtain a prediction value. The prediction method uses the values of pixels around a target pixel or the result of operating them. For example, as shown in FIG. 12, use the pixel values of immediately preceding a, immediately upper b, upper left c, and upper right d pixels with respect to a target pixel X. Which is to be used as the first prediction may be fixed or adaptively changed.
[Step S24] Determine whether the result of the first prediction matches the pixel value of the target pixel.
[Step S25] If the result of the first prediction matches the pixel value of the target pixel in step S24, skip steps S62 to S64 and S26 to proceed to step S27.
[Step S26] Perform second and subsequent predictions. Details of the predictions are given in FIG. 11. Theh, proceed to step S42.

[Step S42] Determine whether a prediction value obtained by a second or subsequent prediction method matches the value of a target pixel. If not, proceed to step S27, and if so, proceed to step S43.
[Step S43] To make the matching prediction method a first prediction method, change the prediction order table. For example, as shown in FIG. 14, put the matching method in the first position and put the old first method in the second position. Lower the order of the second and subsequent methods if necessary.
[Step S27] Advance pointer p by one pixel position. Then, return to step S61.

Tenth Embodiment

Next, a tenth embodiment will be described. In this embodiment, an image encoding apparatus is implemented by hardware. The image encoding apparatus is a modified version of the image encoding apparatus disclosed in Japanese Published Unexamined Patent Application No. Hei 9-224253, which was described previously.

Figure 4:
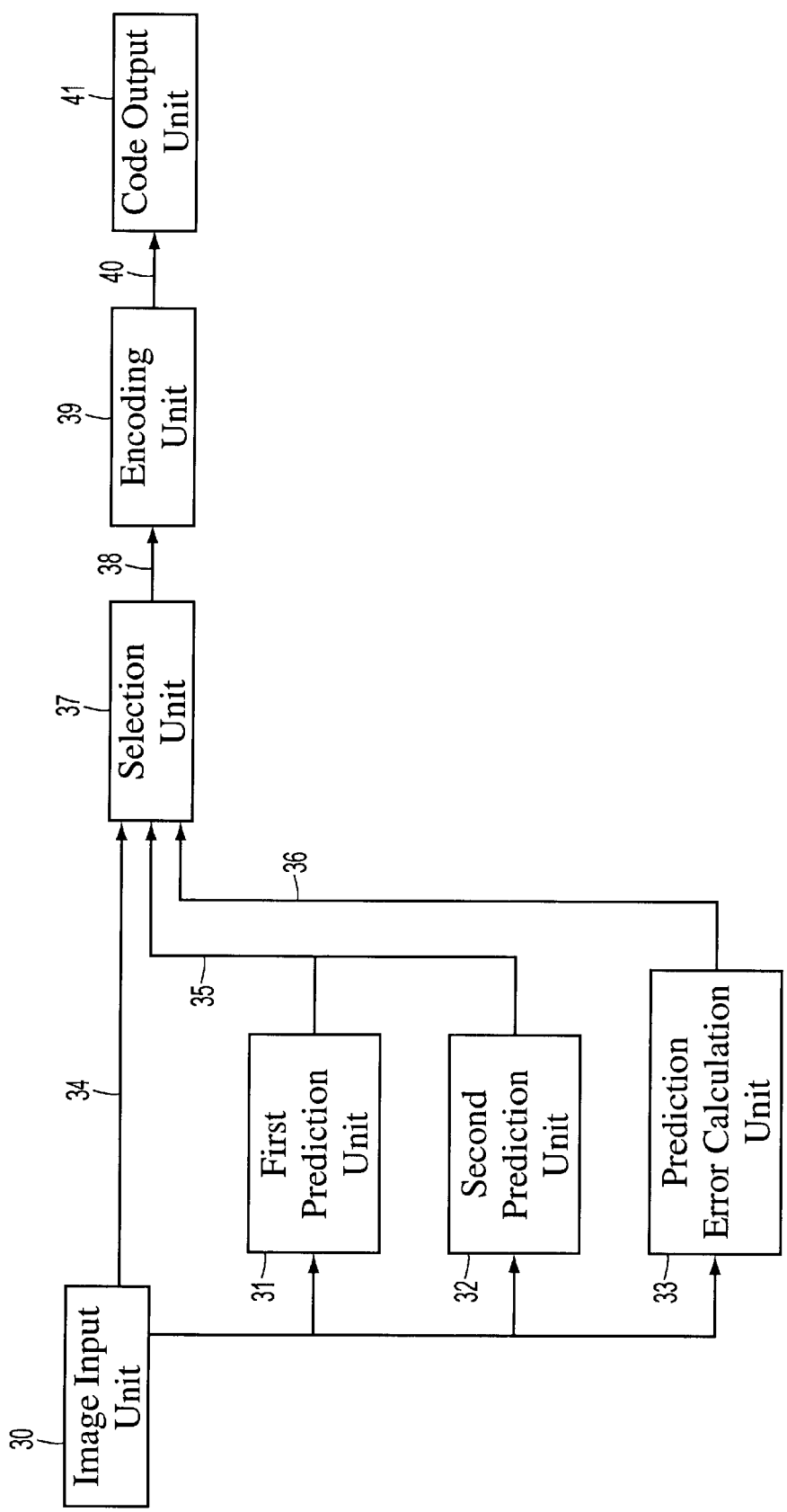
FIG. 4 is a block diagram showing further another conventional image encoding apparatus.
Figure 5:
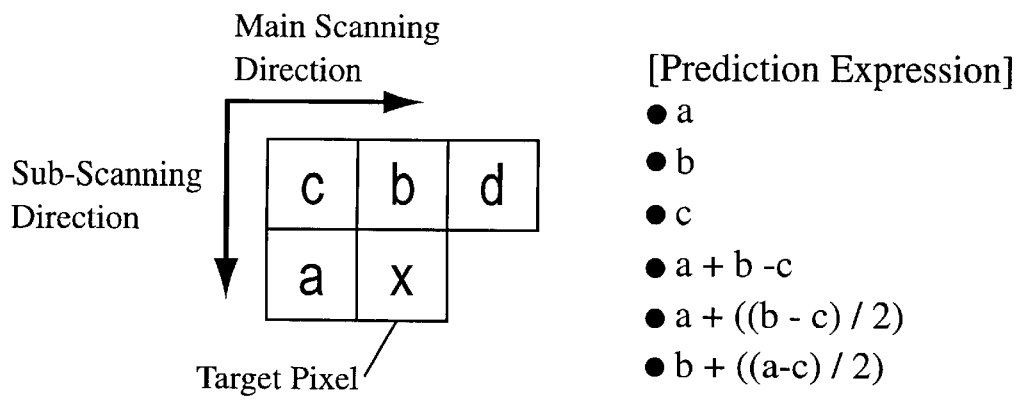
FIG. 5 explains a prediction method of an image encoding apparatus in FIG. 4.
Figure 6:
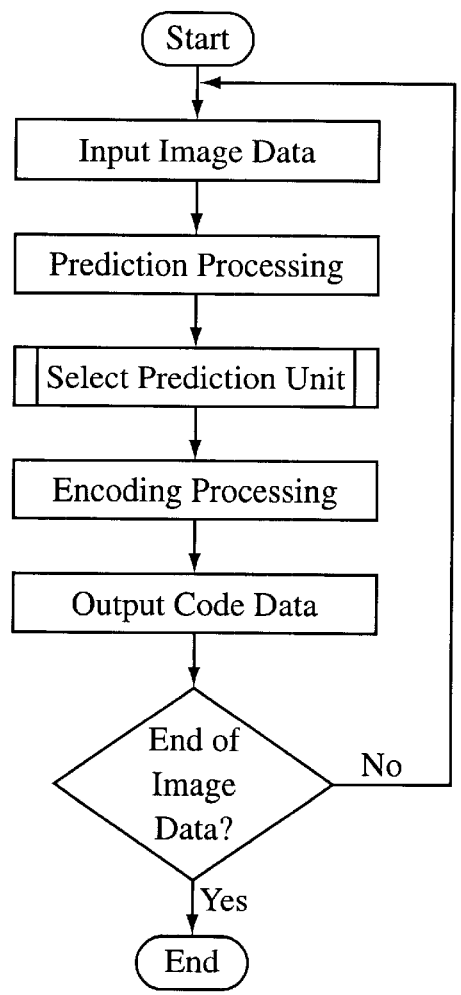
FIG. 6 is a flowchart for explaining the operation of the image encoding apparatus in FIG. 4.
Figure 7:
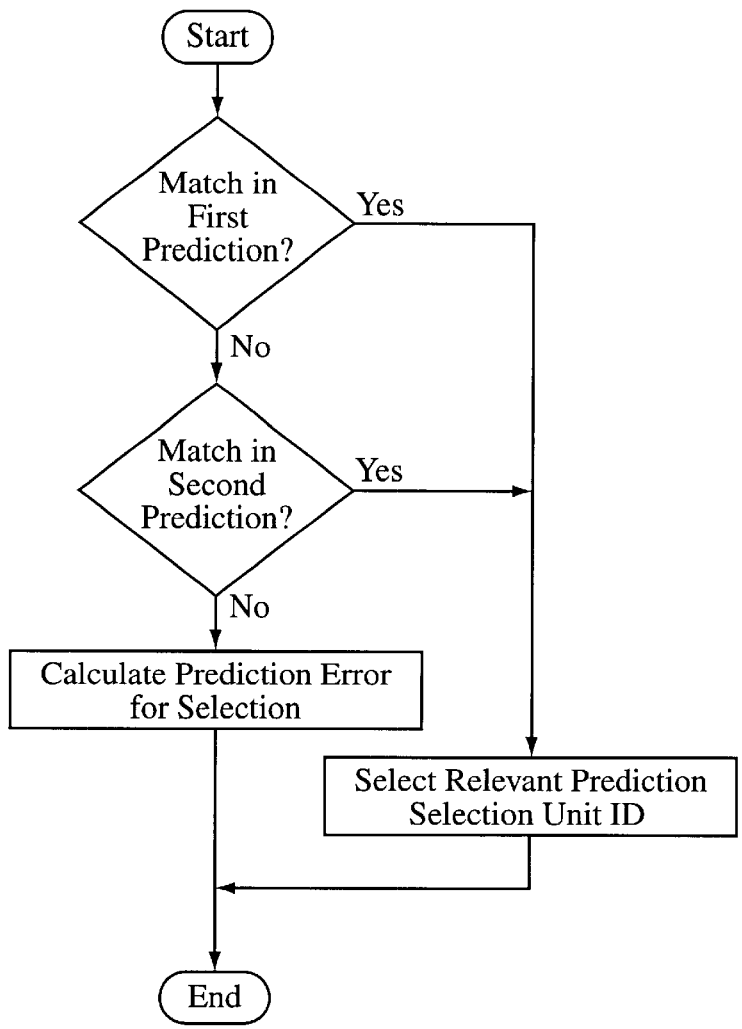
FIG. 7 is a flowchart for explaining the operation of the image encoding apparatus in FIG. 4.
Figure 8:
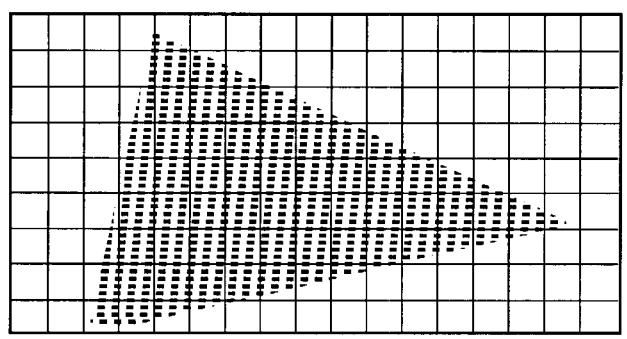
FIG. 8 is a diagram for explaining the present invention.
Figure 25:
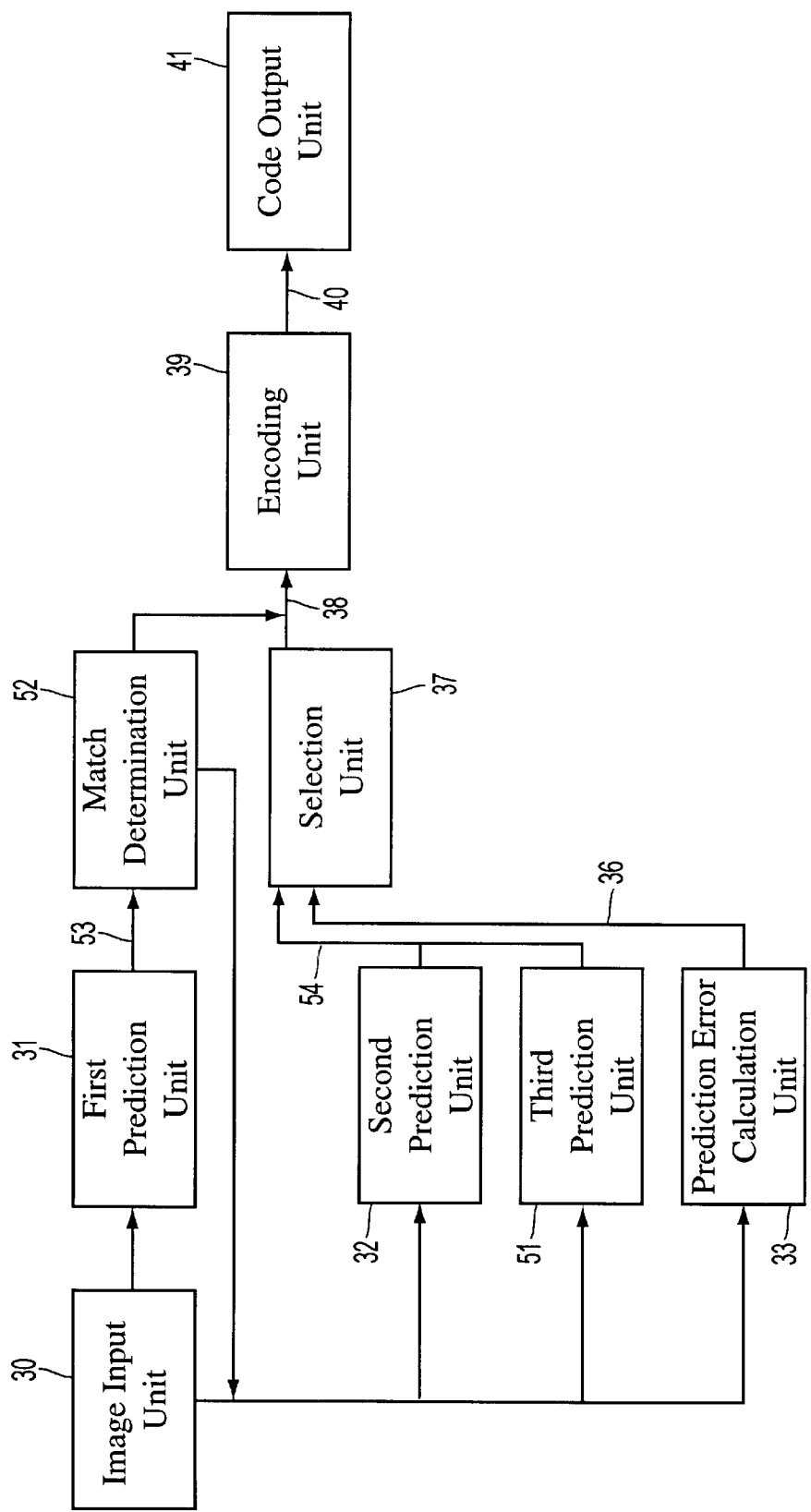
FIG. 25 is a block diagram showing the configuration of a tenth embodiment of the present invention.

FIG. 25 shows an image encoding apparatus of the tenth embodiment, and locations in FIG. 25 corresponding to those in FIG. 4 are assigned corresponding reference numerals.

In FIG. 25, a first prediction unit 31, a second prediction unit 32, and a third prediction unit 51 predict a target pixel from surrounding pixels and generate prediction value data 53 and 54. A match determination unit 52 determines whether the prediction of the first prediction unit 31 comes true, and if so, it sends identification information indicating the first prediction unit 31 to an encoding unit 39. On the other hand, if the prediction of the first prediction unit 31 is not correct, the match determination unit 52 notifies the second prediction unit 32, third prediction unit 51, and Prediction error calculation unit 33 and enables them. Other operations are the same as those of the image encoding apparatus in FIG. 4.

As apparent from the above description, according to the present invention, full color images produced in computer graphics and page description language processing systems can be compressed fast.

What is claimed is:

1. An image encoding method, comprising:
   a first prediction step of predicting the pixel value of a target pixel to be encoded within an image by a first prediction method;
   a first comparison step of comparing a prediction value predicted in said first prediction step with the pixel value of said target pixel;
   a step of, when said prediction value and the pixel value of said target pixel match in said first comparison step, encoding and outputting identification information for identifying said first prediction method;
   a second prediction step of, when the prediction value predicted by said first prediction method and the pixel value of said target pixel do not match in said first comparison step, performing prediction by a prediction method other than said first prediction method;
   a second comparison step of comparing a prediction value predicted by a prediction method other than said first prediction method with the pixel value of said target pixel; and
   a step of, when one of prediction values predicted in said second comparison step and the pixel value of said target pixel match, encoding and outputting identification information for identifying the prediction method associated with the one of the prediction values predicted, and when it is determined that any of said prediction values does not match the pixel value of said target pixel, calculating an error between the pixel value of said target pixel and a prediction value predicted by a predetermined prediction method and encoding and outputting the calculated error.

2. The image encoding method according to claim 1, wherein when a prediction value by said first prediction method and the pixel value of said target pixel do not match, the order in which the first prediction method and the prediction method other than the first prediction method are applied is interchanged.

3. The image encoding method according to claim 1, wherein when a prediction value by said first prediction method and the pixel value of said target pixel match, the number of matches is only counted without outputting encoded identification information, and when a prediction value by said first prediction method and the pixel value of said target pixel do not match, if the number of matches counted is not zero, encoded identification information of said first prediction method is outputted by the number of matches, or the number of matches is encoded and outputted.

4. The image encoding method according to claim 1, wherein a variable for recording a pixel position is provided, and when a prediction value by said first prediction method and the pixel value of said target pixel do not match, if the difference between a pixel position recorded in said variable and the pixel position of said target pixel is two or more, the identification information of said first prediction method is encoded and outputted the number of times equivalent to the difference, or the difference is encoded and outputted, and the pixel position of said target pixel is recorded in said variable, while when a prediction value by said first prediction method and the pixel value of said target pixel match, said pixel position is not recorded in said variable.

5. The image encoding method according to claim 1, wherein a variable for storing a prediction pixel value is provided, and when said first prediction method is a prediction method that uses the pixel value of a pixel preceding said target pixel, a prediction pixel value stored in said variable is compared with the pixel value of said target pixel without referencing the pixel preceding said target pixel as prediction processing, while when said first prediction method is a prediction method that references a pixel other than a pixel preceding said target pixel, prediction processing is performed based on the prediction method to determine whether said prediction pixel value and the pixel value of said target pixel match.

6. The image encoding method according to claim 1, wherein before encoding each line of an image, data for detecting line end is appended after the line to be processed.

7. The image encoding method according to claim 1, wherein the prediction values of a predetermined number of contiguous pixels are compared with the same number of target pixels at the same time.

8. An image encoding apparatus, comprising:
   an image input means that inputs images;
   a plurality of pixel value prediction means that predict the pixel value of target pixel to be encoded within an image inputted by said image input means by respectively different prediction methods;
   a match determination means that determines whether prediction values predicted by said plurality of pixel value prediction means match the pixel value of said target pixel, and if so, outputs identification information for identifying the prediction method associated with the one of the prediction values matched;

a prediction error calculation means that calculates an error between the pixel value of a target pixel within the image inputted by said image input means and a prediction value predicted by a predetermined prediction method;

an encoding means that encodes said identification information and said error; and an output means that outputs codes encoded by said encoding part, wherein if a prediction value of a first prediction means of said pixel value prediction means matches the pixel value of said target pixel, prediction processing applies to only said first prediction means and match with said target pixel value is determined, while only when the prediction value of said first prediction means does not match the pixel value of said target pixel, prediction processing applies to a prediction means other than said first prediction means to obtain a prediction value, and match with said target pixel value is determined.

9. The image encoding apparatus according to claim 8, wherein said plurality of image value prediction means are assigned priority according to the number of matches of predictions by them.

10. The image encoding apparatus according to claim 8, including a prediction value storing means that stores a prediction value of pixel, wherein when a prediction method of said first prediction means is a prediction method that uses the pixel value of a pixel preceding a target pixel, without prediction processing applying to said first prediction means, it is determined whether a pixel value stored in said prediction value storing means matches the pixel value of said target pixel.

11. The image encoding apparatus according to claim 8, including a pixel position storing unit that records the pixel position of said target pixel when a prediction value of said first prediction means does not match the pixel value of said target pixel, and records no pixel position when a prediction value of said first prediction means matches the pixel value of said target pixel, wherein the number of times that prediction values of said first prediction means continuously match the pixel value of said target pixel is determined from the difference between the pixel position of said target pixel and the pixel position recorded in said pixel position recording unit and said encoding means encodes said number of continuous matches.

12. The image encoding apparatus according to claim 8, wherein an area for placing data for detecting the end of a line is provided after the last pixel of each line of an input image so that, as data in a position next to the last pixel, data which will not match prediction values of any prediction means if the data is a target pixel is placed before starting processing for each line.

13. The image encoding apparatus according to claim 8, wherein said first prediction means predicts a predetermined number of contiguous pixels and compares them with the same number of target pixels at the same time.

14. An image encoding method, comprising:

a first prediction step of predicting the pixel value of a target pixel to be encoded within an image by a first prediction method;

a first comparison step of comparing a prediction value predicted by said first prediction method with the pixel value of said target pixel;

a step of, when said prediction value and the pixel value of said target pixel match in said first comparison step, encoding and outputting identification information for identifying said first prediction method;

a second prediction step of, when the prediction value predicted by said first prediction method and the pixel value of said target pixel do not match in the first comparison step, performing prediction by a prediction method other than said first prediction method;

a second comparison step of comparing a prediction value predicted by a prediction method other than said first prediction method with the pixel value of said target pixel; and a step of, when one of prediction values predicted in the second comparison step and the pixel value of said target pixel match, encoding and outputting identification information for identifying the prediction method associated with the one of the prediction values predicted.

15. A computer readable medium in which an image encoding computer program designed to have a computer execute steps including:

a first prediction step of predicting the pixel value of a target pixel to be encoded within an image by a first prediction method;

a first comparison step of comparing a prediction value predicted by said first prediction method with the pixel value of said target pixel;

a step of, when said prediction value and the pixel value of said target pixel match in the first comparison step, encoding and outputting identification information for identifying said first prediction method;

a second prediction step of, when the prediction value predicted by said first prediction method and the pixel value of said target pixel do not match in said first comparison step, performing prediction by a prediction method other than said first prediction method;

a second comparison step of comparing a prediction value predicted by a prediction method other than said first prediction method with the pixel value of said target pixel; and a step of, when one of prediction values predicted in said second comparison step and the pixel value of said target pixel match, encoding and outputting identification information for identifying the prediction method associated with the one of the prediction values predicted, and when it is determined that any of said prediction values does not match the pixel value of said target pixel, calculating an error between the pixel value of said target pixel and a prediction value predicted by a predetermined prediction method and encoding and outputting the calculated error.

16. An image encoding method, comprising:

a first prediction step of predicting the pixel value of a target pixel to be encoded within an image by a first prediction method;

a first comparison step of comparing a prediction value predicted in said first prediction step with the pixel value of said target pixel;

a step of, when said prediction value and the pixel value of said target pixel match in said first comparison step, encoding and outputting identification information for identifying said first prediction method;

a second prediction step of, when the prediction value predicted by said first prediction method and the pixel value of said target pixel do not match in said first comparison step, performing prediction by a prediction and encoding method other than said first prediction method;

a second comparison step of comparing a prediction value predicted by said second prediction step with the pixel value of said target pixel; and a step of, when one of prediction values predicted in said second comparison step and the pixel value of said target pixel match, encoding and outputting identification information for identifying the prediction method associated with the prediction values predicted.

17. An image encoding method, comprising:

a step of inputting at a time a plurality of pixels of an image to be encoded;

a first prediction step of predicting a plurality of pixel values of target pixels inputted in said input step by a first prediction method;

a comparison step of comparing a plurality of prediction values predicted in said first prediction step with the pixel values of target pixels;

a step of, when said prediction values and the pixel values of said target pixels match in said first comparison step, encoding and outputting identification information for identifying said first prediction method;

a second prediction step of, when said prediction values predicted by said first prediction method and the pixel values of said target pixels do not match in said first comparison step, performing prediction by a prediction method other than said first prediction method;

a second comparison step of comparing a prediction value predicted by said second prediction step with the pixel value of said target pixel; and a step of, when one of prediction values predicted in said second comparison step and the pixel value of said target pixel match, encoding and outputting identification information for identifying the prediction method associated with the prediction values predicted.

18. The image encoding method according to claim 17, wherein said plurality of pixels are pixels contained in each line of an image to be subjected to said encoding.

19. The image encoding method according to claim 17, wherein said first and second prediction methods each include a step of calculating a prediction hit count; and wherein a prediction method in said first prediction step is determined based on an order in accordance with a calculation result of said hit count calculating step.

* * * * *